United States Patent
Xu et al.

(10) Patent No.: US 11,212,736 B2
(45) Date of Patent: Dec. 28, 2021

(54) SEARCH SPACE DESIGN WITH OVERBOOKING

(71) Applicant: QUALCOMM Incorporated, San Diego, CA (US)

(72) Inventors: Huilin Xu, San Diego, CA (US); Heechoon Lee, San Diego, CA (US); Jing Sun, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/373,475

(22) Filed: Apr. 2, 2019

(65) Prior Publication Data

US 2019/0313321 A1    Oct. 10, 2019

Related U.S. Application Data

(60) Provisional application No. 62/654,096, filed on Apr. 6, 2018.

(51) Int. Cl.
*H04L 12/28*     (2006.01)
*H04W 48/12*    (2009.01)
*H04W 72/04*    (2009.01)

(52) U.S. Cl.
CPC ......... *H04W 48/12* (2013.01); *H04W 72/048* (2013.01); *H04W 72/0446* (2013.01)

(58) Field of Classification Search
CPC .......................... H04W 48/12; H04W 72/0446
See application file for complete search history.

(56) References Cited

U.S. PATENT DOCUMENTS

2014/0092836 A1\* 4/2014 Park .................. H04W 72/042
                                                                370/329
2019/0110279 A1\* 4/2019 Behravan ......... H04W 72/0446
(Continued)

OTHER PUBLICATIONS

Intel Corporation: "Remaining Details of PDCCH Search Spaces and CORESETs," 3GPP Draft; R1-1802407 Intel-SS CORESET, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018, XP051397932, 10 Pages, Retrieved from the Internet: URL: http://www.3gpp.org/ftp/tsg%5Fran/WG1%5FRL1/TSGR1%5F92/Docs/ [retrieved on Feb. 17, 2018] p. 1, paragraph 2 Option 3; p. 4 figure 2; table 1.

(Continued)

*Primary Examiner* — Bo Hui A Zhu
(74) *Attorney, Agent, or Firm* — Holland & Hart LLP; Timothy R. Hirzel

(57) ABSTRACT

Improved methods, systems, devices, or apparatuses that support search space design are described. The described techniques enhance the number and utility of applied control channel candidates in the presence of blind decoding and control channel element (CCE) channel estimation limitations. The techniques allocate available blind decodes using a nested mapping scheme over one or more dimensions, based on a prioritization. In some other cases, the number of blind decodes may be allocated, either uniformly, or proportionally, between the plurality of search space set occasions. In some cases, the applied control channel candidates may be determined by dropping control channel candidates along one or more dimensions (e.g., search space set, or search space set occasion), until the blind decoding limitation or CE limitation is satisfied.

24 Claims, 14 Drawing Sheets

(56) References Cited

U.S. PATENT DOCUMENTS

| | | | |
|---|---|---|---|
| 2019/0150073 A1* | 5/2019 | Tiirola | H04W 72/10 |
| | | | 455/434 |
| 2019/0215098 A1* | 7/2019 | Tiirola | H04W 72/0446 |
| 2020/0021419 A1* | 1/2020 | Taherzadeh Boroujeni | |
| | | | H04L 5/0007 |

OTHER PUBLICATIONS

International Search Report and Written Opinion—PCT/US2019/025585—ISA/EPO—dated Jun. 14, 2019.
LG Electronics: "Remaining Issues on Search Space," 3GPP Draft; R1-1800372, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051384827, 4 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] p. 1, paragraph 2.1 p. 4, paragraph 3.
NTT Docomo, et al: "Search Space", 3GPP Draft; R1-1802480, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018, XP051397986, 17 pages, Retrieved from the Internet: URL: http://www.3gpp.org/ftp/tsg%5Fran/WG1%5FRL1/TSGR1%5F92/Docs/ [retrieved on Feb. 17, 2018] p. 2, paragraph 3 Proposal 2; p. 11.

* cited by examiner

SEARCH SPACE DESIGN WITH OVERBOOKING

CROSS REFERENCES

The present application for patent claims the benefit of U.S. Provisional Patent Application No. 62/654,096 by XU et al., entitled "Search Space Design With Overbooking," filed Apr. 6, 2018, assigned to the assignee hereof, and expressly incorporated herein.

BACKGROUND

The following relates generally to wireless communications, and more specifically to search space design with overbooking.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as those having multiple possible control channel configurations and/or multiple possibly overlapping monitoring occasions, search space configurations may allow overbooking of decoding candidates. For example, overbooking may refer to configuring more blind decoding candidates than a UE may be capable of processing. Additionally or alternatively, overbooking may refer to search spaces that span an amount of resources that exceeds a UE capability for performing channel estimation. Overbooking of search spaces may present challenges in scheduling and monitoring for downlink control information.

SUMMARY

The described techniques relate to improved methods, systems, devices, or apparatuses that support search space design with overbooking. In some cases, due to blind decoding and control channel element (CCE) channel estimation (CE) limitations (e.g., CCE limitation), some control channel candidates (e.g., Physical Downlink Control Channel (PDCCH) candidates) of one or more search space sets may need to be dropped (or pruned) for blind decoding and/or CE purposes. In order to enhance (e.g., optimize) the number and utility of applied control channel candidates, the available blind decodes may be allocated using a nested mapping scheme over one or more dimensions, based on a prioritization. In some aspects, a time duration, such as a slot, may comprise a plurality of search space set occasions, and the plurality of search space set occasions may be associated with one or more search space sets configured for the time duration. Further, each configured search space set may comprise a set of control channel candidates over multiple aggregation levels. The aggregation level of a control channel candidate may represent the number of continuous CCEs spanned by the control channel candidate, and the location of CCEs corresponding to each control channel candidate may be determined by a hashing function.

In some examples, each search space set occasion in the slot, and control channel candidate for an aggregation level, may be associated with an index. Further, the nested mapping scheme may involve allocating the number of available decodes in a prioritized order over the three (3) dimensions (i.e., search space set occasion index, aggregation level, control channel candidate index for an aggregation level). In some other cases, the number of blind decodes may be allocated, either uniformly, or proportionally, between the plurality of search space set occasions. In some cases, the applied control channel candidates may be determined by dropping control channel candidates along one or more dimensions (e.g., search space set, or search space set occasion), until the blind decoding limitation or CE limitation is satisfied. In some cases, the described techniques may serve to enhance the number of applied control channel candidates used for blind decoding and channel estimation at the UE.

A method of wireless communication is described. The method may include identifying a set of search space set occasions for a slot, the set of search space set occasions associated with one or more search space sets configured for the slot, each search space set including a set of control channel candidates of one or more aggregation levels of a set of aggregation levels, determining a total number of available blind decodes for the slot based on a blind decoding limitation, determining an applied set of control channel candidates by allocating the total number of available blind decodes based on a nested mapping scheme over a set of dimensions according to a prioritized order, and communicating based on the applied set of control channel candidates.

An apparatus for wireless communication is described. The apparatus may include a processor, memory in electronic communication with the processor, and instructions stored in the memory. The instructions may be executable by the processor to cause the apparatus to identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine an applied set of control channel candidates by allocating the total number of available blind decodes based on a nested mapping scheme over a set of dimensions according to a prioritized order, and communicate based on the applied set of control channel candidates.

Another apparatus for wireless communication is described. The apparatus may include means for identifying a set of search space set occasions for a slot, the set of search space set occasions associated with one or more search space sets configured for the slot, each search space set including a set of control channel candidates of one or more aggregation levels of a set of aggregation levels, means for determining a total number of available blind decodes for the slot based on a blind decoding limitation, means for determining an applied set of control channel candidates by allocating the total number of available blind decodes based on a nested mapping scheme over a set of dimensions according to a prioritized order, and means for communicating based on the applied set of control channel candidates.

A non-transitory computer-readable medium storing code for wireless communication is described. The code may include instructions executable by a processor to identifying a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine an applied set of control channel candidates by allocating the total number of available blind decodes based on a nested mapping scheme over a set of dimensions according to a prioritized order, and communicate based on the applied set of control channel candidates.

Some examples of the method, apparatuses, and non-transitory computer-readable medium described herein may further include operations, features, means, or instructions for determining a total number of available control channel elements (CCEs) for the set of search space set occasions based on a CCE channel estimation limitation, where the determining the applied set of control channel candidates includes, hashing, according to the nested mapping scheme, each control channel candidate to CCEs and admitting, according to the nested mapping scheme, the each hashed control channel candidate to the applied set of control channel candidates based on comparing a number of hashed CCEs to the total number of available CCEs.

Some examples of the method, apparatuses, and non-transitory computer-readable medium described herein may further include operations, features, means, or instructions for identifying, for the slot, a set of common decoding candidates associated with one or more common search space sets and hashing the set of common decoding candidates to control resources of the slot, where the total number of available CCEs may be determined based on a number of hashed CCEs for the set of common decoding candidates and the CCE channel estimation limitation.

In some examples of the method, apparatuses, and non-transitory computer-readable medium described herein, the admitting according to the nested mapping scheme may include operations, features, means, or instructions for admitting, upon determining that the number of hashed CCEs may have reached the total number of available CCEs, additional ones of the each hashed control channel candidates to the applied set of control channel candidates based on a condition that hashed CCE locations for the additional ones of the each hashed control channel candidates overlap with previously hashed CCEs.

Some examples of the method, apparatuses, and non-transitory computer-readable medium described herein may further include operations, features, means, or instructions for identifying, during the nested mapping scheme, that the number of hashed CCEs may have reached the total number of available CCEs and rehashing remaining ones of the each hashed control channel candidates to previously hashed CCEs.

In some examples of the method, apparatuses, and non-transitory computer-readable medium described herein, the set of dimensions include indices of the set of search space set occasions, the set of aggregation levels, and control channel candidate indices for respective aggregation levels.

In some examples of the method, apparatuses, and non-transitory computer-readable medium described herein, each control channel candidate of the sets of control channel candidates for each of the search space sets may have one blind decoding candidate.

In some examples of the method, apparatuses, and non-transitory computer-readable medium described herein, at least one control channel candidate of the sets of control channel candidates for the one or more search space sets may have a set of blind decoding candidates.

In some examples of the method, apparatuses, and non-transitory computer-readable medium described herein, the one or more search space sets include a set of search space sets associated with a set of component carriers, and where the control channel candidate indices include a combined index set for control channel candidates of the set of search space sets associated with the set of component carriers.

In some examples of the method, apparatuses, and non-transitory computer-readable medium described herein, the one or more search space sets may be associated with a nested search space structure or a non-nested search space structure.

Some examples of the method, apparatuses, and non-transitory computer-readable medium described herein may further include operations, features, means, or instructions for identifying, for the slot, a set of common decoding candidates associated with one or more common search space sets and hashing the set of common decoding candidates to control resources of the slot, where the total number of available blind decodes may be determined based on a number of decoding candidates of the set of common decoding candidates and the blind decoding limitation.

In some examples of the method, apparatuses, and non-transitory computer-readable medium described herein, the determining the applied set of control channel candidates may include operations, features, means, or instructions for allocating the total number of available blind decodes to the set of search space set occasions prior to the allocating the total number of available blind decodes based on the nested mapping scheme over the set of dimensions.

In some examples of the method, apparatuses, and non-transitory computer-readable medium described herein, the total number of available blind decodes may be uniformly allocated to the set of search space set occasions.

In some examples of the method, apparatuses, and non-transitory computer-readable medium described herein, the total number of available blind decodes may be allocated to the set of search space set occasions in proportion to a number of sets of control channel candidates of the set of search space set occasions.

In some examples of the method, apparatuses, and non-transitory computer-readable medium described herein, the communicating may include operations, features, means, or instructions for monitoring the set of search space set occasions for the slot for the applied set of control channel candidates and communicating with a base station based on control information determined from the monitoring.

In some examples of the method, apparatuses, and non-transitory computer-readable medium described herein, the communicating includes transmitting control information via the applied set of control channel candidates.

A method of wireless communication is described. The method may include identifying a set of search space set occasions for a slot, the set of search space set occasions associated with one or more search space sets configured for the slot, each search space set including a set of control channel candidates of one or more aggregation levels of a set of aggregation levels, determining a total number of available blind decodes for the slot based on a blind decoding limitation, determining whether an overbooking constraint applies for the slot based on comparing a number of the set of search space set occasions, a total number of control channel candidates, or a total number of configured blind decodes of the set of search space set occasions to a threshold, determining an applied set of control channel candidates based on the determination of whether the overbooking constraint applies for the slot, and communicating based on the applied set of control channel candidates.

An apparatus for wireless communication is described. The apparatus may include a processor, memory in electronic communication with the processor, and instructions stored in the memory. The instructions may be executable by the processor to cause the apparatus to identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine whether an overbooking constraint applies for the slot based on comparing a number of the set of search space set occasions, a total number of control channel candidates, or a total number of configured blind decodes of the set of search space set occasions to a threshold, determine an applied set of control channel candidates based on the determination of whether the overbooking constraint applies for the slot, and communicate based on the applied set of control channel candidates.

Another apparatus for wireless communication is described. The apparatus may include means for identifying a set of search space set occasions for a slot, the set of search space set occasions associated with one or more search space sets configured for the slot, each search space set including a set of control channel candidates of one or more aggregation levels of a set of aggregation levels, means for determining a total number of available blind decodes for the slot based on a blind decoding limitation, means for determining whether an overbooking constraint applies for the slot based on comparing a number of the set of search space set occasions, a total number of control channel candidates, or a total number of configured blind decodes of the set of search space set occasions to a threshold, means for determining an applied set of control channel candidates based on the determination of whether the overbooking constraint applies for the slot, and means for communicating based on the applied set of control channel candidates.

A non-transitory computer-readable medium storing code for wireless communication is described. The code may include instructions executable by a processor to identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine whether an overbooking constraint applies for the slot based on comparing a number of the set of search space set occasions, a total number of control channel candidates, or a total number of configured blind decodes of the set of search space set occasions to a threshold, determine an applied set of control channel candidates based on the determination of whether the overbooking constraint applies for the slot, and communicate based on the applied set of control channel candidates.

In some examples of the method, apparatuses, and non-transitory computer-readable medium described herein, the number of the set of search space set occasions, the total number of control channel candidates, or the total number of configured blind decodes of the set of search space set occasions may be less than the threshold and the determining the applied set of control channel candidates includes admitting each control channel candidate for each of the set of search space set occasions into the applied set of control channel candidates.

In some examples of the method, apparatuses, and non-transitory computer-readable medium described herein, the number of the set of search space set occasions, the total number of control channel candidates, or the total number of configured blind decodes of the set of search space set occasions may be greater than the threshold and the determining the applied set of control channel candidates includes allocating the total number of available blind decodes based on a nested mapping scheme over a set of dimensions according to a prioritized order.

Some examples of the method, apparatuses, and non-transitory computer-readable medium described herein may further include operations, features, means, or instructions for identifying, for the slot, a set of common decoding candidates associated with one or more common search space sets and hashing the set of common decoding candidates to control resources of the slot, where the total number of available blind decodes may be determined based on a number of decoding candidates of the set of common decoding candidates and the blind decoding limitation.

In some examples of the method, apparatuses, and non-transitory computer-readable medium described herein, the communicating may include operations, features, means, or instructions for monitoring the set of search space occasions for the slot for the applied set of control channel candidates and communicating with a base station based on control information determined from the monitoring.

In some examples of the method, apparatuses, and non-transitory computer-readable medium described herein, the communicating includes transmitting control information via the applied set of control channel candidates.

A method of wireless communication is described. The method may include identifying a set of search space set occasions for a slot, the set of search space set occasions associated with one or more search space sets configured for the slot, each search space set including a set of control channel candidates of one or more aggregation levels of a set of aggregation levels, determining a total number of available blind decodes for the slot based on a blind decoding limitation, mapping each control channel candidate for each of the set of search space set occasions to one or more available blind decodes, determining, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold, and communicating based on the applied set of control channel candidates.

An apparatus for wireless communication is described. The apparatus may include a processor, memory in electronic communication with the processor, and instructions stored in the memory. The instructions may be executable by the processor to cause the apparatus to identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, map each control channel candidate for each of the set of search space set occasions to one or more available blind decodes, determine, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold, and communicate based on the applied set of control channel candidates.

Another apparatus for wireless communication is described. The apparatus may include means for identifying a set of search space set occasions for a slot, the set of search space set occasions associated with one or more search space sets configured for the slot, each search space set including a set of control channel candidates of one or more aggregation levels of a set of aggregation levels, means for determining a total number of available blind decodes for the slot based on a blind decoding limitation, means for mapping each control channel candidate for each of the set of search space set occasions to one or more available blind decodes, means for determining, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold, and means for communicating based on the applied set of control channel candidates.

A non-transitory computer-readable medium storing code for wireless communication is described. The code may include instructions executable by a processor to identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, map each control channel candidate for each of the set of search space set occasions to one or more available blind decodes, determine, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold, and communicate based on the applied set of control channel candidates.

In some examples of the method, apparatuses, and non-transitory computer-readable medium described herein, the at least one dimension may be search space sets or search space set occasions.

Some examples of the method, apparatuses, and non-transitory computer-readable medium described herein may further include operations, features, means, or instructions for identifying, for the slot, a set of common decoding candidates associated with a common search space set and hashing the set of common decoding candidates to control resources of the slot, where the total number of available blind decodes may be determined based on a number of decoding candidates of the set of common decoding candidates and the blind decoding limitation.

In some examples of the method, apparatuses, and non-transitory computer-readable medium described herein, the communicating may include operations, features, means, or instructions for monitoring of the set of search space set occasions for the slot for the applied set of control channel candidates and communicating with a base station based on control information determined from the monitoring.

In some examples of the method, apparatuses, and non-transitory computer-readable medium described herein, the communicating includes transmitting control information via at least one of the applied set of control channel candidates.

DETAILED DESCRIPTION

Figure 1:
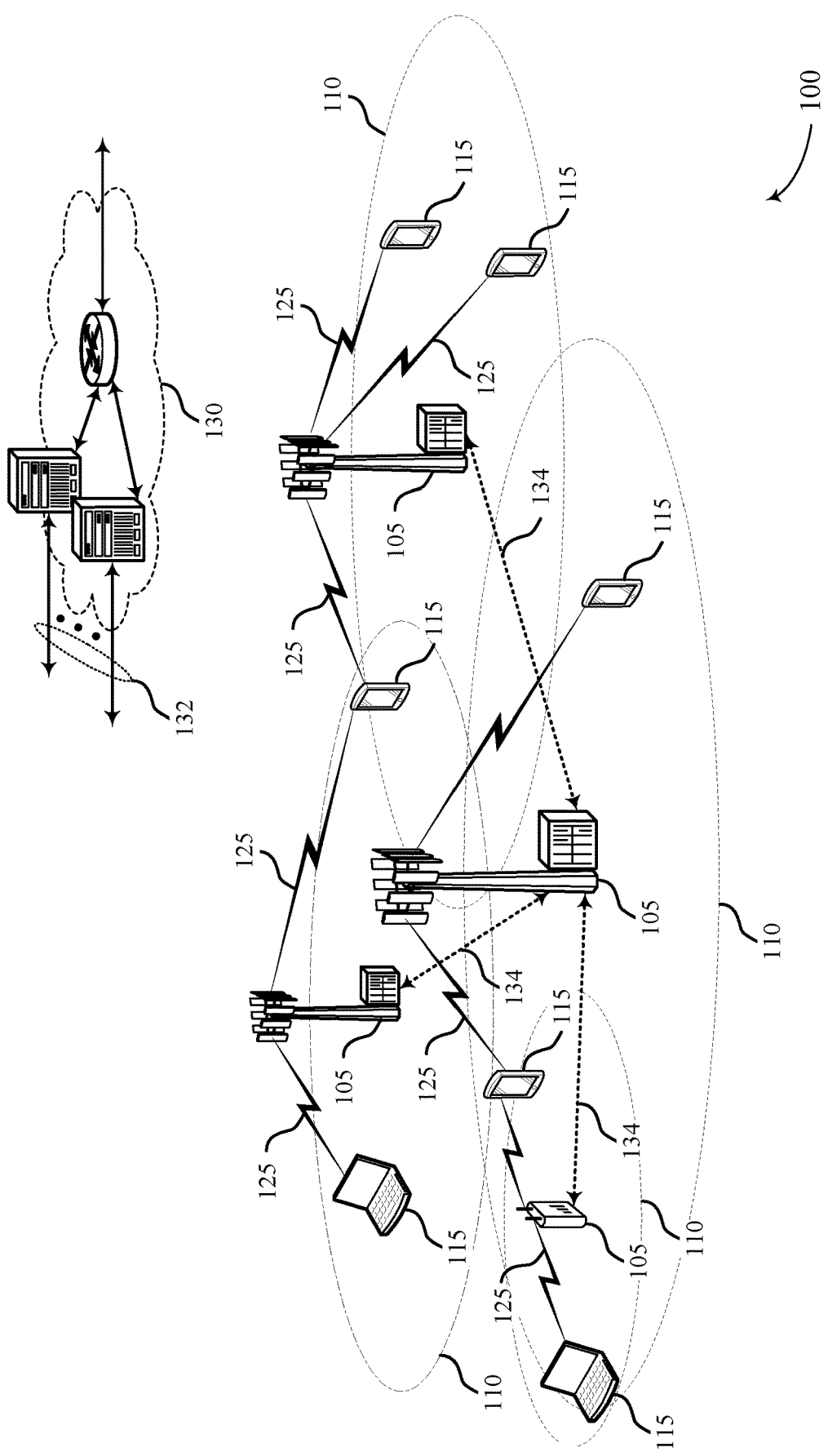
FIG. 1 illustrates an example of a wireless communications system in accordance with aspects of the present disclosure.

In some wireless communications systems, a base station may transmit control information to a user equipment (UE) or a group of UEs on the downlink. The UEs may use the downlink control information (DCI) to support communications with the base station. The base station may configure search space sets according to control channel candidates (e.g., PDCCH candidates) at one or more aggregation levels to use for these DCI transmissions. When configuring a search space set, the base station may determine a control resource set (CORESET) containing the search space set. This CORESET may include a number of control channel elements (CCEs), and the search space set may be mapped to a CCE space corresponding to a subset of CCEs of the CORESET. The base station may identify control channel candidates to allocate at each aggregation level for the search space set, and may assign positions for the control channel candidates within the CCE space according to a hash function. The UEs may identify this search space set configuration and may monitor the CCEs corresponding to the hashed control channel candidates for any DCI transmissions from the base station. A control region may be a search space monitoring occasion for one or more search space sets that has a common reference signal configuration (e.g., shares a scrambling sequence, etc.).

In some cases, a pre-defined duration (e.g., a slot) may comprise one or more control regions. Further, each control region within the slot may comprise one or more CSS sets and one or more UESS sets. Further, each search space set may be uniquely identified by a search space set identifier (ID). In some wireless communications systems, UEs may have limitations for processing a control channel. For example, UE limitations may include a limitation on the number of blind decodes or on the number of resources for performing channel estimation (CE) within a certain duration (e.g., a symbol period or slot). In some cases, the CSS set(s) may have a higher priority than UESS set(s). Thus, for each control region within a slot, the UE may hash the set of common decoding candidates associated with one or more CSS sets prior to hashing the sets of UE-specific decoding candidates associated with the one or more UESS sets. Further, since the UE may hash the common decoding candidates and UE-specific decoding candidates separately to CCEs within the control region, the UE may reuse the channel estimation from the one or more CSS sets for the one or more UESS sets. In some cases, some UE-specific decoding candidates may be admitted for blind decoding without increasing the resources for CE, which may be referred to as free admission between hashing common and UE-specific decoding candidates to the same CCEs.

In some cases, a periodicity and an offset for each search space set may be known to a UE (e.g., predetermined or configured by the network). In some cases, the pattern periodicity may be measured in slots (e.g., 1, 2, 4, or 8 slots). In some aspects, the peak numbers of configured blind decodes and CCEs used for CE in a slot may be substantially higher than their average values over time. Further, if the network (or base station) adheres to the limits for blind decodes and CCEs used for CE in each slot, average numbers for the two may be lower than a specified average limit, which may hamper UE performance. In some cases, to address aspects of the above identified problem, network configuration may not allow overbooking, such that the number of configured blind decodes and CCEs used for CE stays within the limits. However, additional RRC signaling may be deployed to enhance flexibility of search space distribution in the time domain. In some other cases, search space configurations may allow overbooking of control channel candidates (e.g., configuring more blind decoding candidates than a UE may be capable of processing, or search spaces spanning more CCEs than can be used for CE). In such cases, overbooking handling strategies may be employed to remove blind decodes and/or CCEs exceeding the limits.

In some cases, the network may specify an overbooking handling for UESS, such that after all CSS control channel candidates are selected and mapped, control channel candidates configured for UESS sets may be mapped, as long as neither blind decoding nor CE limits are exceeded. In some cases, control channel candidates configured for UESS sets may be mapped in a specific order over a plurality of dimensions. In some cases, the plurality of dimensions may comprise indices of the plurality of search space set occasions, the plurality of aggregation levels, and control channel candidate indices for respective aggregation levels. Further, a nested mapping scheme (e.g., nested loops over multiple loop levels) may be deployed.

In some cases, blind decoding candidates may be continuously mapped in a specific order, over a plurality of dimensions, until either the blind decoding limit or CCE limit is exceeded, or all search space sets are fully mapped. In some cases, the plurality of dimensions may comprise: 1) indices of the plurality of search space set occasions; 2) the plurality of aggregation levels; and 3) control channel candidate indices for respective aggregation levels. Further, a nested mapping scheme (e.g., nested loops over multiple loop levels) may be deployed. In some examples, each control channel candidate may be associated with one DCI size. In such cases, each control channel candidate of the set of control channel candidates for the search space sets may have a single blind decoding candidate. In some other cases, at least one control channel candidate of the set of control channel candidates may comprise a plurality of blind decoding candidates (e.g., if the control channel candidate is associated with more than one DCI size). Thus, one nested mapping scheme may be chosen from a total of six different options or combinations for mapping of UESS blind decoding candidates, each providing different levels of fairness and efficiency.

In some other cases, determining the applied set of control channel candidates may include allocating the total number of available blind decodes (i.e., blind decode budget) to the plurality of search space set occasions prior to allocating the available blind decodes based on the nested mapping scheme over the plurality of dimensions. In such cases, the plurality of dimensions may be condensed down to two (2), that is, aggregation level and control channel candidate indices for respective aggregation levels. In some cases, the total number of available blind decodes may be uniformly allocated to the plurality of search space occasions. In some other cases, the total number of available blind decodes may be allocated to the plurality of search space set occasions in proportion to a number of control channel candidates of the plurality of search space set occasions.

In some cases, determining the applied set of control channel candidates may be left up to UE implementation, for instance, based on determining if an overbooking constraint applies for the slot. In some cases, determining whether the overbooking constraint applies may be based in part on comparing a number of the plurality of search space set occasions, a number of the plurality of search space sets, a total number of control channel candidates, and/or a total number of configured blind decodes of the plurality of search space set occasions to a threshold. In some cases, for out of every periodic set of M slots (e.g., M=80 slots), only N slots may allow overbooking. In some cases, only one of blind decode overbooking or CCE overbooking may be allowed, which may reduce complexity at the UE for determining the applied set of control channel candidates.

In some cases, determining the applied set of control channel candidates may comprise iteratively dropping control channel candidates along at least one dimension (e.g., search space set, or search space set occasion) until the applied set of control channel candidates do not exceed the blind decoding or CCE limitations, or the number of remaining search space sets or search space set occasions do not exceed a threshold. In some cases, the threshold may be based in part on a capability of the UE.

Aspects of the disclosure are initially described in the context of a wireless communications system. Aspects of the disclosure are further illustrated by and described with reference to control channel candidate admitting, mapping, and pruning procedures. Aspects of the disclosure are further illustrated by and described with reference to apparatus diagrams, system diagrams, and flowcharts that relate to search space design.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a base station 105 may configure a UE 115 with a set of CCEs of a control channel within a time duration, such as a slot. Additionally, the base station 105 may configure a plurality of search space set occasions, and the plurality of search space set occasions may be associated with one or more search space sets comprising sets of control channel candidates at multiple different aggregation levels. In some cases, the one or more search space sets may include one or more CSS sets, UESS sets, or a combination thereof. In some cases, the CSS sets may have a higher priority than UESS sets. Thus, for each control region within a slot, the UE 115 may hash the set of common candidates (i.e., control channel candidates, such as PDCCH candidates, associated with one or more CSS sets), prior to hashing the sets of UE-specific candidates (i.e., control channel candidates associated with the one or more UESS sets). Further, since the UE 115 may hash the common candidates and UE-specific candidates separately to CCEs within the control region, the UE 115 may attempt to reuse the channel estimation from the one or more CSS sets. Thus, some UE-specific decoding candidates may be admitted for blind decoding without increasing the resources for CE, which may be referred to as free admission between hashing common and UE-specific candidates.

In some cases, due to blind decoding and control channel element (CCE) CE limitations, some control channel candidates (e.g., Physical Downlink Control Channel (PDCCH) candidates) of one or more search space sets, such as UESS sets, may need to be dropped (or pruned) for blind decoding and/or CE purposes. In order to enhance the number and utility of applied control channel candidates, the available blind decodes may be allocated using a nested mapping scheme over one or more dimensions based on a prioritization.

As described above, a time duration, such as a slot, may comprise a plurality of search space set occasions, and the plurality of search space set occasions may be associated with one or more search space sets configured for the time duration. Further, each configured search space set may comprise a set of control channel candidates over multiple aggregation levels. The aggregation level of a control channel candidate may represent the number of continuous CCEs spanned by the control channel candidate, and the location of CCEs corresponding to each control channel candidate may be determined by a hashing function. In some examples, each search space set occasion in the slot, and control channel candidate for an aggregation level, may be associated with an index. Further, the nested mapping scheme may involve allocating the number of available decodes in a prioritized order over the three (3) dimensions (i.e., search space set occasion index, aggregation level, control channel candidate index for an aggregation level). In some other cases, the number of blind decodes may be allocated, either uniformly, or proportionally, between the plurality of search space set occasions. In some cases, the applied control channel candidates may be determined by dropping control channel candidates along one or more dimensions (e.g., search space set, or search space set occasion) until the blind decoding limitation or CE limitation is satisfied. Additionally or alternatively, the applied control channel candidates may be determined by dropping one or more search space sets or search space set occasions until the number of search space sets or search space set occasions is below a threshold, where the threshold may be based in part on the UE capability. In some cases, the described techniques may serve to enhance the number of applied control channel candidates used for blind decoding and channel estimation at the UE 115.

Figure 2:
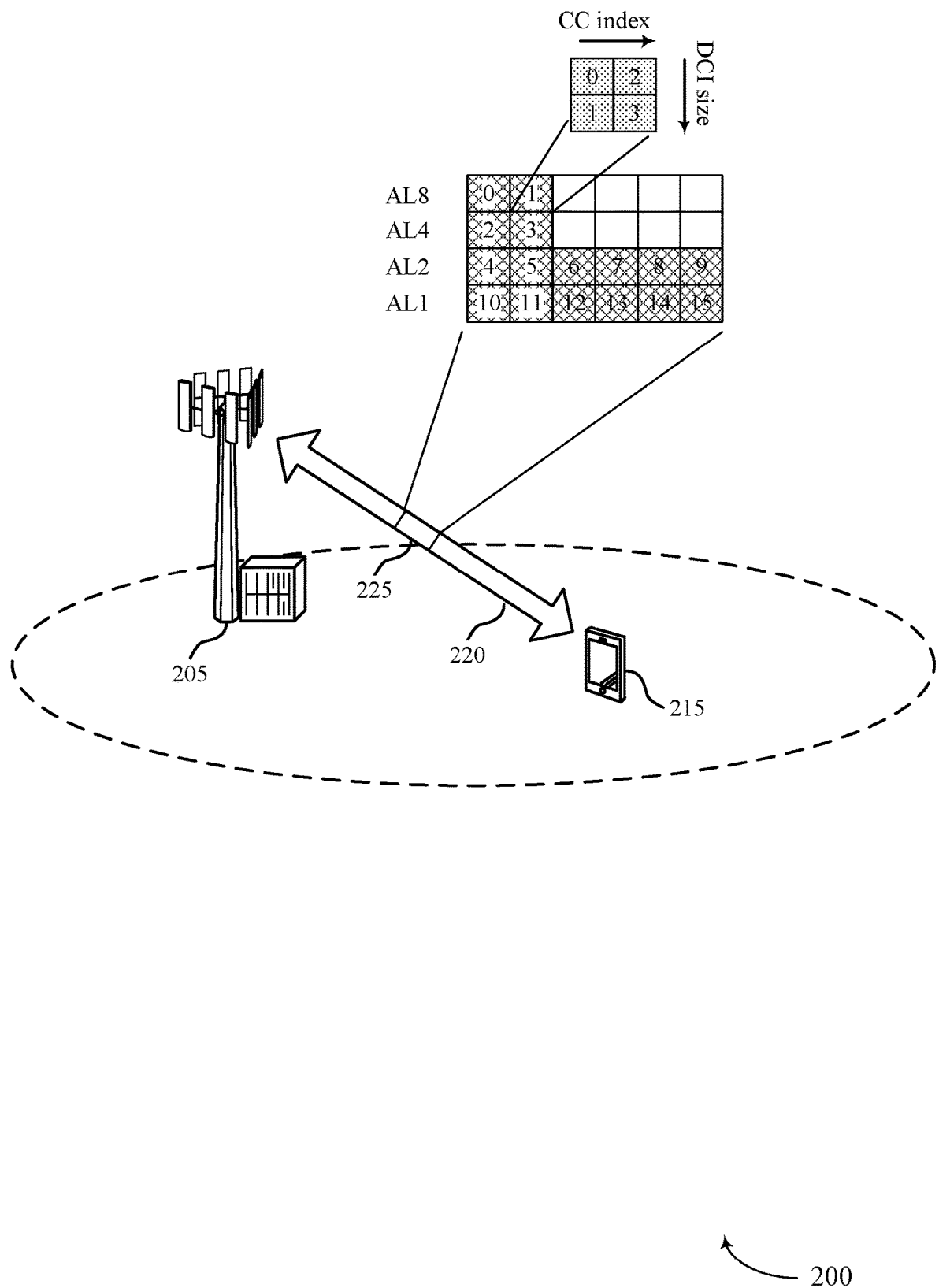
FIG. 2 illustrates an example of a wireless communications system in accordance with aspects of the present disclosure.

FIG. 2 illustrates an example of a wireless communications system 200 that supports search space design in accordance with aspects of the present disclosure. In some examples, wireless communications system 200 may implement aspects of wireless communications system 100. The wireless communications system 200 may include UE 215 and base station 205, which may be examples of the UE 115 and base station 105 described with reference to FIG. 1. As shown, UE 215 may communicate with base station 205 via communication links 220. The wireless communications system 200 may also operate according to a radio access technology (RAT) such as a fifth generation (5G) new radio (NR) RAT, although techniques described herein may be applied to any RAT.

In some cases, the base station 205 may transmit control information indicating the scheduled and allocated resources in a downlink transmission to the UE 215. For example, the base station 205 may transmit DCI on a downlink control channel, such as a PDCCH. In some examples, the base station 205 may transmit UE-specific scheduling assignments for downlink resource allocation, uplink grants, physical random access channel (PRACH) responses, uplink power control commands, and common scheduling assignments for signaling messages (e.g., such as system information) on the PDCCH. The base station 205 may transmit the control information during one or more symbols within a given TTI (e.g., a slot, a mini-slot, an sTTI).

The base station 205 may configure a CORESET and search space for transmission of control information (e.g., DCI) to the UE 215 on a downlink control channel. In a control region of a TTI, there may be more than 1 location associated with a DCI transmission, and the UE 215 may search all the possible locations. The possible locations for the DCI may differ depending on the configured CORESET, whether the search space is UE-specific or common, and also the supported ALs. In some cases, a pre-defined duration (e.g., a slot) may comprise none or one or more control regions. In some cases, different CORESETS may be considered to be different control regions, even when overlapping partially or completely. In addition, a same CORESET may result in multiple control regions, when configured for multiple monitoring occasions (e.g., different starting symbols within a slot, etc.). For instance, the same CORESET may be monitored in different control regions (e.g., in different slots, mini-slots, etc.). In some cases, overlapping CCEs associated with different CORESETS may be counted separately. Further, overlapping CCEs associated with different starting symbols (e.g., PDCCH starting symbols) of the same or different search space sets within the same CORESET may be counted separately. In some cases, overlapping CCEs associated with the same PDCCH starting symbol of the same or different search space sets within the same CORESET may not be counted separately (i.e., count as 1 CCE). In some cases, each search space set may be uniquely identified by a search space set identifier (ID).

Thus, different slots may comprise different number of control regions. Further, each control region within the slot may include zero or more common search spaces (CSSs), and zero or more UE-specific search spaces of varying aggregation levels, the combination referred to as CSS sets and UESS sets, respectively. In some cases, the CSS set may have a higher priority than UESS sets. Thus, a search space set may include a set of control channel candidates at multiple ALs, each of which may form a search space at a given AL. It should be noted that the AL for a search space may refer to the number of CCEs in multiples (e.g., AL 4 may indicate that control information for that AL is transmitted in multiples of four CCEs) used by the base station 205 to transmit control information to the UE 215.

In some cases, control channel candidates having different control information (e.g., downlink control information (DCI)) payload sizes may be counted as separate blind decodes. In some cases, control channel candidates comprising different sets of CCEs may be considered as separate blind decodes. Further, control channel candidates in different CORESETs may be counted as separate blind decodes, while control channel candidates having the same control information payload size and comprising the same set of CCEs in the same CORESET may be counted as one (1) blind decode.

The locations within a CORESET of the control channel candidates of a search space or search space set may be determined by a hash function and/or an offset. In some cases, the hash function may be an example of a uniform or approximately uniform distribution hash function (e.g., such as a combinatorial index hash function). A base station 205 utilizing such a hash function may spread the control channel candidates for each given aggregation level as evenly as possible across the range of CCEs. Alternatively, the hash function may be pseudo-random hash function. The range of CCEs may correspond to a CORESET, a TTI, or a subset of CCEs (e.g., where the CCEs may be non-contiguous, but may be stitched together for the purpose of hashing). Decoding candidates at different aggregation levels of the search space set may be hashed independently. In some cases, this may result in base station 205 configuring a search space set where decoding candidates of different aggregation levels overlap for some CCEs.

In some cases, UE 215 in wireless communications system 200 may have limitations for processing a control channel. For example, UE limitations may include a limitation on the number of blind decodes, or number of resources for performing CE within a certain duration (e.g., a symbol period or slot). In some cases, configured search space sets may include common search space (CSS) sets, UE-specific search space (UESS) sets, or a combination thereof. In some cases, the CSS set(s) may have a higher priority than UESS set(s). Thus, for each control region within a slot, the UE 215 may hash the set of common decoding candidates associated with one or more CSS sets, prior to hashing the sets of UE-specific decoding candidates associated with the one or more UESS sets. Further, since the UE 215 may hash the common decoding candidates and UE-specific decoding candidates separately to CCEs within the control region, the UE may reuse the channel estimation from the one or more CSS sets for the one or more UESS sets. In some cases, some UE-specific decoding candidates may be admitted for blind decoding without increasing the resources for CE, which may be referred to as free admission between hashing common and UE-specific decoding candidates to the same CCEs.

In some cases, a periodicity and an offset for each search space set may be known to UE 215, and may be predetermined or configured by the network. In some cases, the pattern periodicity may be measured in slots (e.g., 1, 2, 4, or 8 slots). In some aspects, the peak numbers of configured blind decodes and CCEs used for CE in a slot may be substantially higher than their average values over time. Further, if the base station 205 adheres to the limits for blind decodes and CCEs used for CE in each slot, average numbers for the two may be lower than a specified average limit, which may hamper performance at UE 215. In some cases, to address aspects of the above identified problem, network configuration may not allow overbooking, such that the number of configured blind decodes and CCEs used for CE stays within the limits. However, additional RRC signaling may be deployed to enhance flexibility of search space distribution in the time domain. In some other cases, search space configurations may allow overbooking of control channel candidates (e.g., configuring more blind decoding candidates than UE 215 may be capable of processing, or search spaces spanning more CCEs than can be used for CE). In such cases, overbooking handling strategies may be employed to remove blind decodes and/or CCEs exceeding the limits. In some cases, the base station 205 may determine the decoding candidates to drop based on CORESET priority, search space priority, candidate indexes, candidate aggregation levels, associated DCI formats, or some combination of these parameters.

In some cases, overbooking may not be supported for CSS sets. For instance, the total number of configured blind decodes and CCEs for configured CSS set(s) may not exceed blind decode and CE limits. In some cases, control channel candidates (e.g., PDCCH candidates) associated with CSS may be always monitored by the UE 215. Thus, the network or base station 205 may specify an overbooking handling for UESS, such that after all CSS control channel candidates are selected and mapped, control channel candidates configured for UESS sets may be mapped, as long as neither of blind decoding or CE limits are exceeded. In some cases, control channel candidates configured for UESS sets may be mapped in a specific order over a plurality of dimensions. In some cases, the plurality of dimensions may comprise indices of the plurality of search space set occasions, the plurality of aggregation levels, and control channel candidate indices for respective aggregation levels. Further, a nested mapping scheme (e.g., nested loops over multiple loop levels) may be deployed.

In some cases, the UE 215 may identify for each control region within a time duration, such as a slot, one or more sets of decoding candidates (i.e., common decoding candidates and/or UE-specific decoding candidates) associated with one or more search space sets (i.e., CSS sets and/or UESS sets). In some cases, the CSS set(s) may have a higher priority than UESS set(s). Thus, for each control region within a slot, the UE may hash the set of common decoding candidates associated with one or more CSS sets prior to hashing the sets of UE-specific decoding candidates associated with one or more UESS sets. Further, since the UE may hash the common decoding candidates and UE-specific decoding candidates separately to CCEs within the control region, the UE may attempt to reuse the channel estimation for CSS, if one or more CCEs hashed by a common decoding candidate overlap CCEs hashed by a UE-specific decoding candidate, which may be referred to as free admission. Free admission may refer to, for example, admitting the decoding candidate into the monitored or applied set of decoding candidates where admitting it without the overlap with CCEs having other decoding candidates already hashed would violate the CCE CE limitation. In some cases, free admission may be applied to decoding candidates only where the hashed CCEs for the decoding candidate fully overlap with CCEs having already admitted decoding candidates In some cases, a plurality of search space set occasions may be identified for a slot, where the plurality of search space set occasions may be associated with one or more search space sets configured for the slot. As previously described, each search space set (e.g., UESS set, or CSS set) may comprise a set of control channel candidates of one or more aggregation levels (i.e., number of CCEs spanned by the control channel candidate) of a plurality of aggregation levels. In some cases, a set indexing method may be used for allotting a set occasion index for each of the search space set occasions (e.g., UESS set occasion). In some aspects, the UESS set occasion index may be defined as $\Sigma_{i=0}^{u-1} K_i + k$, for an occasion k of UESS set u, where $K_i$ is the number of occasions for UESS set i in the slot. In some other cases, UESS set occasions may be indexed based on their starting symbols. In some cases, if two occasions have the same starting symbol, the associated UESS set index may be used to determine the UESS set occasion with the lower index.

In some cases, a control channel candidate (e.g., PDCCH candidate) may correspond to the location of a set of contiguous CCEs determined by a hashing/hopping function. In some cases, one or more factors may need to be considered for a search space set occasions. In some cases, carrier aggregation may be deployed in wireless communications system 200, wherein a terminal, such as UE 215 and base station 205, may communicate on multiple component carriers (CCs) over communication link 220. Further, for a terminal supporting multiple CCs, the terminal may need to know which CC a certain DCI relates to. In some aspects, this information may be implicit or explicit, depending on whether cross-carrier scheduling is used or not. In some cases, enabling cross-carrier scheduling (e.g., downlink scheduling assignments may be valid for CCs other than CCs on which they are transmitted) may be done individually via RRC signaling on a per-terminal and per-CC basis.

In some cases, in presence of cross-carrier scheduling, each CC may have its own set of control channel candidate indices (e.g., PDCCH candidate indices) from 0 to number of control channel candidates for the CC−1. In some cases, with cross-carrier scheduling, a PDCCH in CC A, may be used to schedule PDCCH grants for downlink and/or uplink data transmitted on CC B. In some cases, with cross-carrier scheduling, the blind decode and/or CCE limits for PDCCH decoding on CC A may be increased to compensate for the fact that CC A may convey more PDCCH(s) as compared to a single carrier case (i.e., when CC A only conveys PDCCHs for downlink and/or uplink data transmitted on CC A itself, not including CC B). In some cases, within a CC, a PDCCH candidate may be mapped with different DCI sizes. In such cases, each DCI size may need a separate blind decode. In some cases, within a CC, a plurality of PDCCH candidates of the same aggregation level (i.e., spanning the same number of contiguous CCEs) may overlap, if the number of CCEs of the CORESET is smaller than the total number of CCEs for all PDCCH candidates of the same aggregation level.

In some cases, the UE 215 or base station 205 may utilize the maximum of the number of control channel candidates for all CCs as the range for control channel candidate indices in the control channel mapping procedure and determine the location of a control channel candidate by using a hashing (or hopping) function for each CC. In some aspects, the set of control channel candidate indices for all CCs may be combined into a single set of indices. Further, no blind decoding candidate may be allocated to a combined index for a CC if the combined index exceeds the number of control channel candidates for the CC−1.

In some cases, for a combined control channel candidate index, decoding candidates may be continuously mapped for all CCs from the lowest to the highest CC index and applied at the innermost loop of the nested loop, if the combined index does not exceed the number of control channel candidates for a CC−1.

In some cases, different DCI sizes may be mapped to a control channel candidate within a CC. In such cases, UE 215 may need separate blind decodes to establish or determine the size of the DCI transmitted. In some cases, within a CC, and for a combined control channel candidate index, blind decoding candidates may be continuously allocated for all DCI sizes in order of the smallest to the largest DCI size. In some aspects, the allocation may be applied from the innermost loop of the nested loop. For instance, as shown for search space set occasion 225, which may be associated with one or more search space sets comprising a set of control channel candidates indexed from 0 to 15, of one or more aggregation levels (i.e., AL 8, AL 4, AL 2, and AL 1), different decoding candidates (e.g., UE-specific decoding candidates) may be mapped according to DCI size and CC for a control channel candidate index on an aggregation level within the search space set occasion 225 (e.g., PDCCH candidate index 3 on AL 4).

In some cases, within a CC, multiple control channel candidates of the same aggregation level may overlap if the number of CCEs of the CORESET is smaller than the total number of CCEs for all control channel candidates of the same aggregation level. In such cases, only one of the overlapping control channel candidates of the same aggregation level may be mapped to a blind decode candidate, as long as the blind decode limit is not exceeded. Further, the remainder of the overlapping control channel candidates (i.e., control channel candidates that were not mapped to a blind decode candidate) may be skipped. In some cases, control channel candidates with the lowest index may be mapped first to a corresponding blind decode candidate.

In some cases, control channel candidate mapping may utilize CC and blind decode sharing in order to enhance the number of control channel candidates for which CE may be performed. For instance, if a subsequent control channel candidate may be mapped to a set of CCEs already hashed by a prior control channel candidate, the channel estimation for the subsequent control channel candidate (e.g., a PDCCH candidate 2) may be shared with the channel estimation for the prior control channel candidate (e.g., a PDCCH candidate 1) without impacting the remaining CCE budget (i.e., free admission). In some cases, a CCE may be reused if it belongs to an already mapped control channel candidate in a CSS/UESS set occasion in the same CORESET. In some cases, free admission may be permissible or supported for blind decoding purposes. In some aspects, if a first blind decoding candidate is associated with a control channel candidate (e.g., PDCCH candidate 1) and a second blind decoding candidate shares a blind decode with the already mapped PDCCH candidate 1 (i.e., two control channel candidates may not need separate blind decodes), the blind decode budget may remain unchanged.

In some cases, wireless communications system 200 may utilize serial addition and/or dropping of control channel candidates. In some cases, following mapping of control channel candidates associated with CSS and DESS sets until the CCE limit is reached, an unmapped control channel candidate may only be mapped if every CCE spanned by the unmapped control channel candidate overlaps with an already assigned CCE and if the two sets of CCEs are not counted separately. Further, once the CCE limit has been reached, the remainder of the control channel candidates may be re-hashed or re-mapped within the footprint of the already assigned CCEs in the CORESET, while the unmapped control channel candidates may be dropped. It should also be noted that, blind decode candidate mapping may be aborted once the blind decode limit is reached.

In some cases, in order to enable or support CE for CCEs to be reusable across multiple blind decodings involving those CCEs in at least the same CORESET and type of search space (i.e., common or UE-specific), a nested search space structure may be adopted (i.e., search spaces with larger AL may contain CCEs of PDCCH candidates with lower AL). In some cases, if a nested search space structure is adopted, control channel candidates of a higher AL (e.g., spanning 4 or 8 CCEs) may be mapped prior to mapping control channel candidates with a lower AL (e.g., 1 or 2 CCEs) due to free admission of PDCCH candidates of the lower AL. In some other cases, a nested search space structure may not be adopted. In such cases, control channel candidates may be mapped first along the AL dimension in order to ensure CCEs are not quickly used up by control channel candidates of higher ALs, thus allowing more PDCCH candidates to be mapped.

In some cases, blind decoding candidates may be continuously mapped in a specific order, over a plurality of dimensions, until either the blind decoding limit or CCE limit is exceeded, or all search space sets are fully mapped. In some cases, the plurality of dimensions may comprise 1) indices of the plurality of search space set occasions, 2) the plurality of aggregation levels, and 3) control channel candidate indices for respective aggregation levels. Further, a nested mapping scheme (e.g., nested loops over multiple loop levels) may be deployed.

In some examples, each control channel candidate may be associated with one DCI size. In such cases, each control channel candidate of the set of control channel candidates for the search space sets may have a single blind decoding candidate. In some other cases, at least one control channel candidate of the sets of control channel candidates may comprise a plurality of blind decoding candidates (e.g., if the control channel candidate is associated with more than one DCI size). Thus, one nested mapping scheme may be chosen from a total of six different options or permutations for mapping of UESS blind decoding candidates, each providing different levels of fairness and efficiency, as further described with reference to FIGS. 3-5. In some cases, the order for a nested mapping scheme may be denoted from the innermost loop to the outermost loop. For instance, if the mapping is first performed along the control channel candidate index for respective aggregation levels, followed by the aggregation level, and then the UESS set occasion index in the slot, the nested mapping scheme may be denoted as 1, 2, 3.

In some cases, determining the applied set of control channel candidates may be based on determining if an overbooking constraint applies for the slot. In some cases, the UE 215 may determine that the worst case numbers for the configured number of CCEs and/or blind decodes do not exceed each of their limits in a slot. In such cases, the UE 215 may skip the subsequent check for determining if the overbooking constraint applies. In some cases, the worst case CCE number may be determined by counting CCEs separately for all control channel candidates. Further, the worst case blind decode number may be determined if no two or more control channel candidates from the same CORESET use the same set of CCEs and have the same underlying DCI size (i.e., no possibility of free admission, count each control channel candidate as separate blind decode, etc.). In some cases, if worst case numbers for CCEs and/or blind decodes exceed at least one of their limits, one or more search space sets or search space set occasions may be dropped according to a priority of the search space sets or search space set occasions until a CCE or blind decode limit is satisfied.

In some cases, determining whether the overbooking constraint applies may be based in part on comparing a number of the plurality of search space sets, search space set occasions, a total number of control channel candidates, and/or a total number of configured blind decodes of the plurality of search space set occasions to a threshold. In some other cases, blind decode overbooking may not be permissible. In some cases, if the overbooking constraint applies, determination of the applied set of control channel candidates may comprise allocating the total number of available blind decodes based in part on a nested scheme over the plurality of dimensions, and according to a prioritized order, as described above. In some other cases, if the overbooking constraint does not apply, control channel candidates may be admitted into the applied set of control channel candidates until the blind decode limit or CCE limit is reached. In some cases, overbooking may be allowed or supported for only one of blind decoding or CE limitations, which may serve to reduce UE complexity. In some cases, overbooking may be allowed, but only on a subset of slots, a fraction of consecutive slots, or a number of consecutive slots. For instance, an overbooking pattern periodicity may be M slots, where overbooking is allowed for at most N slots, where N<M. Alternatively, overbooking is only allowed for N consecutive slots. In some cases, such an implementation may assist in efficient utilization of memory at the UE, especially with respect to storing a control channel (e.g., PDCCH) configuration after overbooking handling.

In some cases, determining the applied set of control channel candidates may comprise iteratively dropping control channel candidates along at least one dimension (e.g., search space set, or search space set occasion) until the applied set of control channel candidates do not exceed the blind decoding limitation, or CCE limitation, or until the number of remaining search space sets or search space set occasions do not exceed a threshold. In some cases, iterative dropping may be triggered while attempting to map each control channel candidate for each of the plurality of search space set occasions to one or more available blind decodes, and determining that the mapping of the sets of control channel candidates may exceed the blind decoding limitation or a CCE limitation. In some cases, search space set dropping in order to meet or satisfy CCE limits may be based in part on the worst case assumption for CCE (i.e., no free admission or overlapping CCEs).

In some other cases, determining the applied set of control channel candidates may comprise dropping search space sets or search space set occasions until the number of search space sets or search space set occasions does not exceed a threshold, where the threshold may be defined as the UE capability (or based in part on UE capability).

As described, using multiple possible control channel configurations and/or multiple possibly overlapping monitoring occasions in a wireless communications system may provide overbooking of decoding candidates. In some cases, overbooking may configure more blind decoding candidates than a UE 215 may be capable of processing. Furthermore, the overbooking may refer to search spaces that span amount of resources that exceeds UE capability for performing channel estimation. Thus, overbooking of search spaces may present challenges in scheduling and monitoring for downlink control information. The implementations illustrated and described herein may allow for UEs to schedule and monitor downlink control information in overbooking scenarios.

Figure 3:
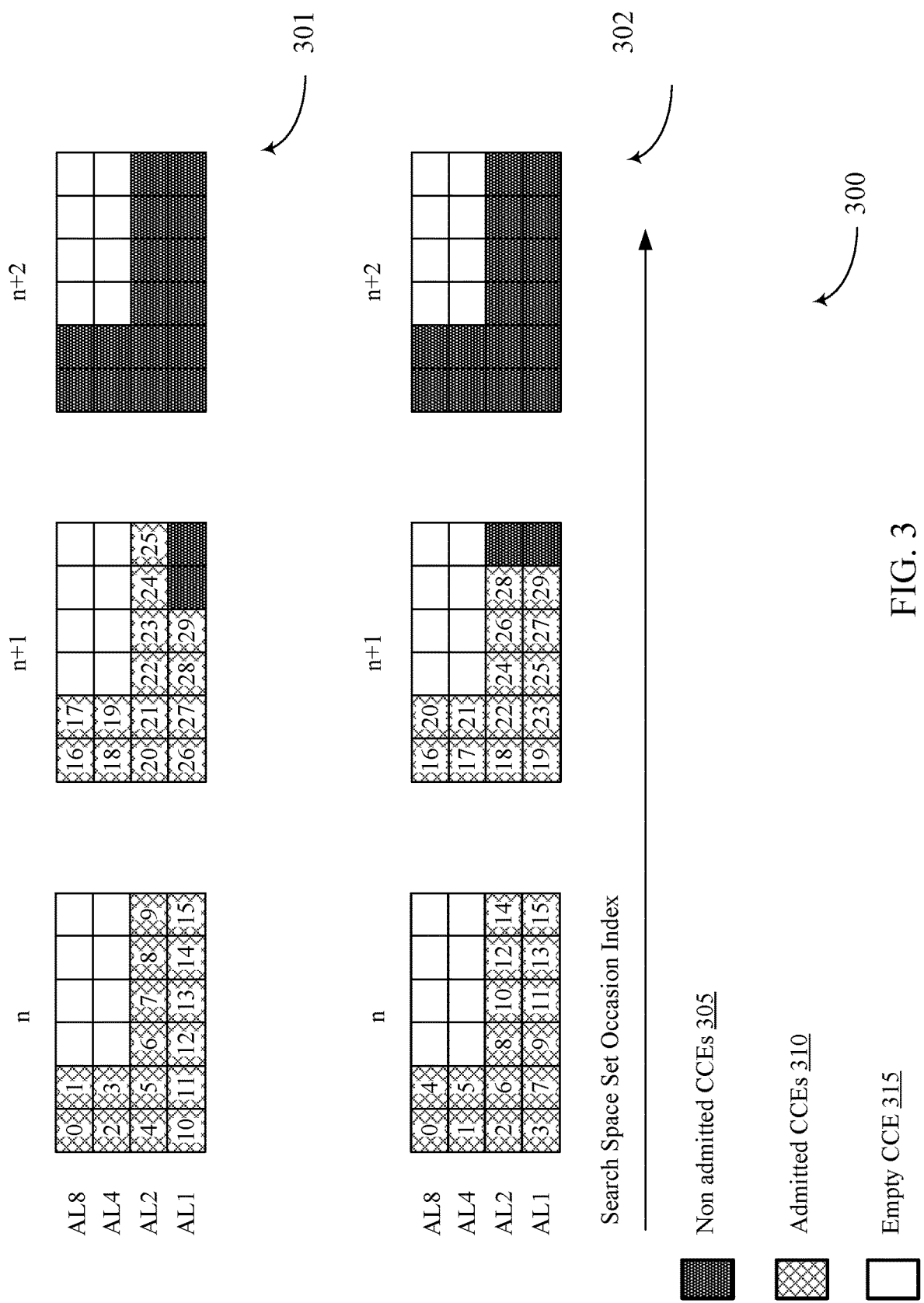
FIG. 3 illustrates an example of a time duration, such as a slot, that supports search space design in accordance with aspects of the present disclosure.
Figure 4:
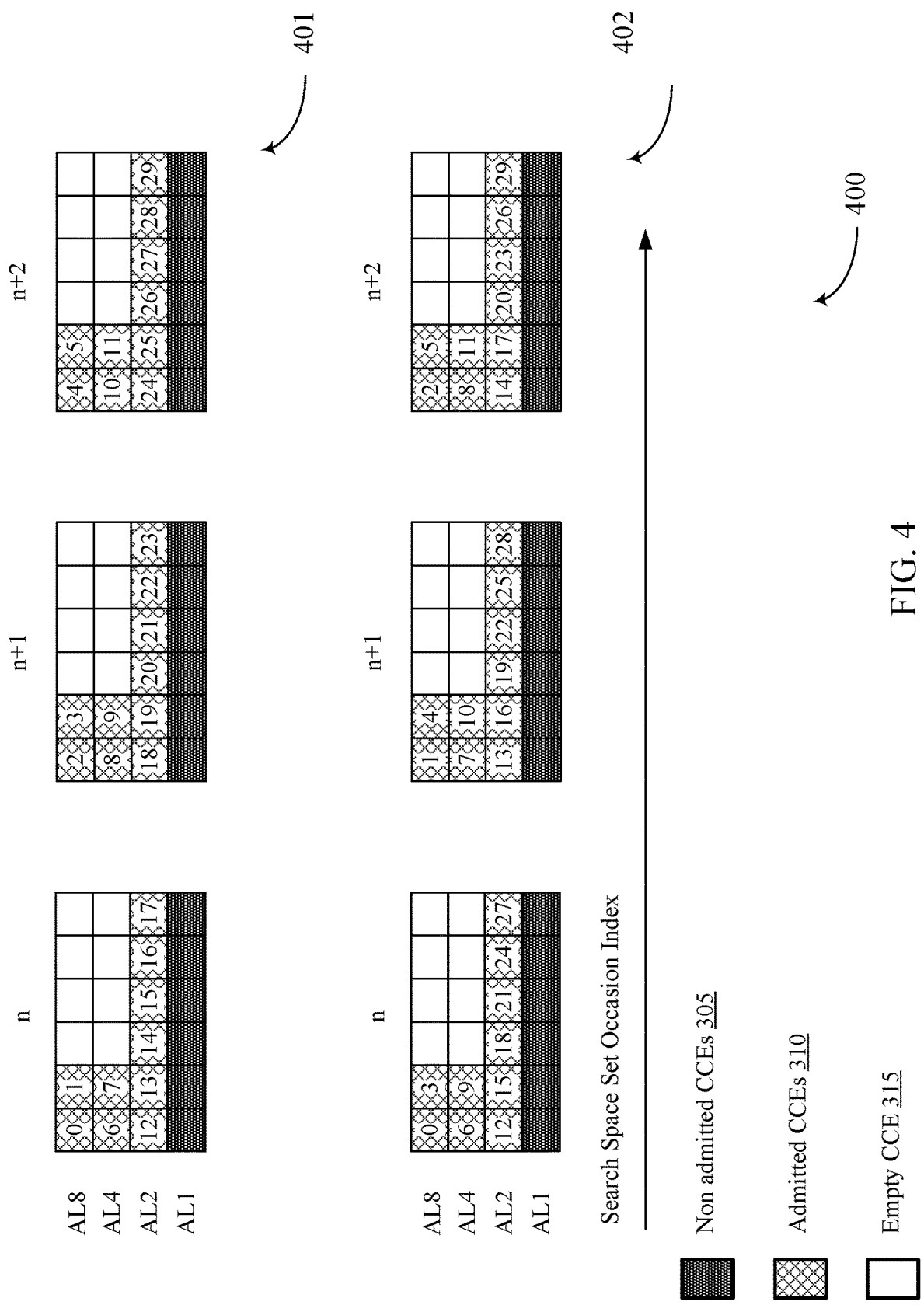
FIG. 4 illustrates an example of a time duration, such as a slot, that supports search space design in accordance with aspects of the present disclosure.
Figure 5:
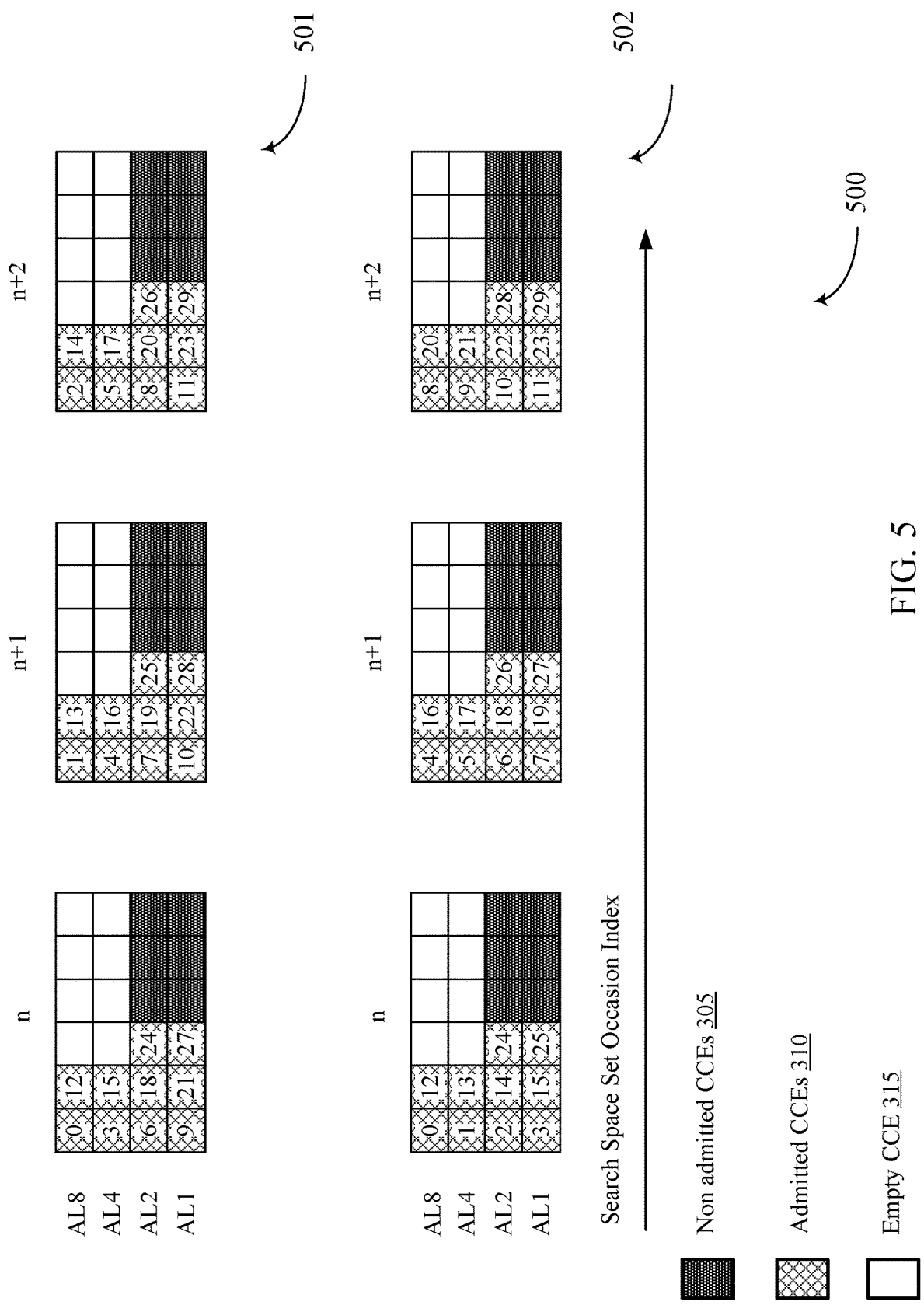
FIG. 5 illustrates an example of a time duration, such as a slot, that supports search space design in accordance with aspects of the present disclosure.

FIGS. 3, 4, and 5 illustrate diagrams 300, 400, and 500 of examples of nested mapping schemes that support search space design in accordance with aspects of the present disclosure. Nested mapping schemes 301, 302, 401, 402, 501, and 502, may support hashing, pruning, and free admission techniques, as described above with reference to FIGS. 1 and 2. Nested mapping schemes 301, 302, 401, 402, 501, and 502 are illustrated as applied to multiple search space set occasions (three (3) in these examples), which may be associated with one or more search space sets configured for a time period such as a TTI, slot, or a control region. Each search space set includes a set of control channel candidates of one or more aggregation levels (e.g., AL8, AL4, AL2, and AL1). In the examples shown, each search space set occasion may be identified by a search space set occasion index (e.g., n, n+1, and n+2) for a respective search space set, and may include 4 aggregation levels (AL8, AL4, AL2, and AL1) with 2, 2, 6, and 6 control channel candidate locations respectively. It should be noted that the number of aggregation levels, number of search space set occasions, and number of control channel candidates for respective aggregation levels are merely chosen as examples.

In the illustrated examples of nested mapping schemes 301, 302, 401, 402, 501, and 502, there may be a total of 30 blind decodes (or blind decoding candidates) for UESS sets following allocation of blind decodes to the CSS set(s). Further, in the examples shown, cross-carrier scheduling is not implemented, and each control channel candidate (i.e., PDCCH candidate) is associated with one DCI size, and hence comprises a single blind decoding candidate. Thus, in order to determine an applied set of control channel candidates for communication, the UE may allocate the total number of available blind decodes based on a nested mapping scheme over the plurality of dimensions and according to a prioritized order (i.e., allotting PDCCH candidates to an available blind decode in an order from 1 through 30). In some cases, the plurality of dimensions may comprise indices of the plurality of search space set occasions, the plurality of aggregation levels, and control channel candidate indices for respective aggregation levels.

In some cases, blind decoding candidates may be continuously mapped in a specific order, over a plurality of dimensions until either the blind decoding limit or CCE limit is exceeded or all search space sets are fully mapped. In some cases, the plurality of dimensions may comprise 1) indices of the plurality of search space set occasions, 2) the plurality of aggregation levels, and 3) control channel candidate indices for respective aggregation levels. Further, a nested mapping scheme (e.g., nested loops over multiple loop levels) may be deployed. In some examples, each control channel candidate may be associated with one DCI size. In such cases, each control channel candidate of the set of control channel candidates for the search space sets may have a single blind decoding candidate. In some other cases, at least one control channel candidate of the sets of control channel candidates may comprise a plurality of blind decoding candidates (e.g., if the control channel candidate is associated with more than one DCI size). Thus, one nested mapping scheme may be chosen from a total of six different options or permutations, for mapping of UESS blind decoding candidates, each providing different levels of fairness and efficiency. In some cases, the order for a nested mapping scheme may be denoted from the innermost loop to the outermost loop, and each search space set occasion in the slot may comprise a combination of non-admitted CCEs 305, admitted CCEs 310, and empty CCEs 315.

For instance, a first nested mapping scheme 301 allotting PDCCH candidates to available blind decodes (e.g., in an order from 1 through 30) along the control channel candidate index for respective aggregation levels in an innermost loop, followed by the aggregation level, and then the UESS set occasion index in the slot in an outermost loop, may be denoted as having the order 1, 2, 3. In some cases, the first nested mapping scheme 301 (1, 2, 3) may be equivalent to removing excessive search space set occasions, as seen via the non-admitted CCEs 305 for search space set occasion index n+2. In some cases, a second nested mapping scheme 302 has order 1, 3, 2, which may comprise performing mapping across the aggregation level first (e.g., in the innermost loop). In some aspects, neither of the nested mapping schemes 301 or 302 may enhance or address fairness across UESS sets, due to removal of excessive search space set occasions.

In some cases, as illustrated in a third nested mapping scheme 401, which may be denoted as 2, 1, 3, the innermost loop may correspond to control channel candidate indices for respective aggregation levels. In some cases, such a nested mapping scheme may not address fairness amongst search space set occasions for different aggregation levels, since mapping may ignore control channel candidates from lower aggregation levels (e.g., AL1). In a fourth nested mapping scheme 402, denoted as 2, 3, 1, fairness may be enhanced if a nested search space structure is adopted for the configured search space sets. In the fourth nested mapping scheme 402, mapping may be performed over search space set occasion indices in the innermost loop and then across control channel candidate indices for a respective aggregation level, before moving to lower aggregation levels.

As illustrated in FIG. 5, a fifth nested mapping scheme 501 may be denoted as 3, 2, 1, wherein the innermost loop is the search space set occasion index (i.e., n, n+1, or n+2). In some aspects, the nested mapping scheme 501 may enhance fairness in the absence of a nested search space structure. In some cases, the sixth nested mapping scheme 502 may be denoted as 3, 1, 2.

In some cases, determining the applied set of control channel candidates may alternatively include allocating the total number of available blind decodes (i.e., blind decode budget) to the plurality of search space set occasions prior to allocating the available blind decodes based on the nested mapping scheme over the plurality of dimensions. In such cases, the blind decode budget for each search space set occasion may be allocated based on one of the nested mapping schemes 301, 302, 401, 402, 501, or 502, and the CE limitation may be applied to reduce the number of blind decodes in the applied set of control channel candidates for a given search space set occasion according to the nested mapping scheme.

In some cases, the total number of available blind decodes may be uniformly allocated to the plurality of search space occasions. In some other cases, the total number of available blind decodes may be allocated to the plurality of search space set occasions in proportion to a number of control channel candidates of the plurality of search space set occasions. It should be noted that mapping of blind decoding candidates (i.e., determining of applied set of control channel candidates) may be stopped if the UESS set occasions are fully mapped or if the blind decode or CCE limit is reached. In some cases, the uniform or proportional allocation schemes for splitting the blind decoding budget amongst UESS set occasions may be combined with any of the six (6) nested mapping schemes described above.

Figure 6:
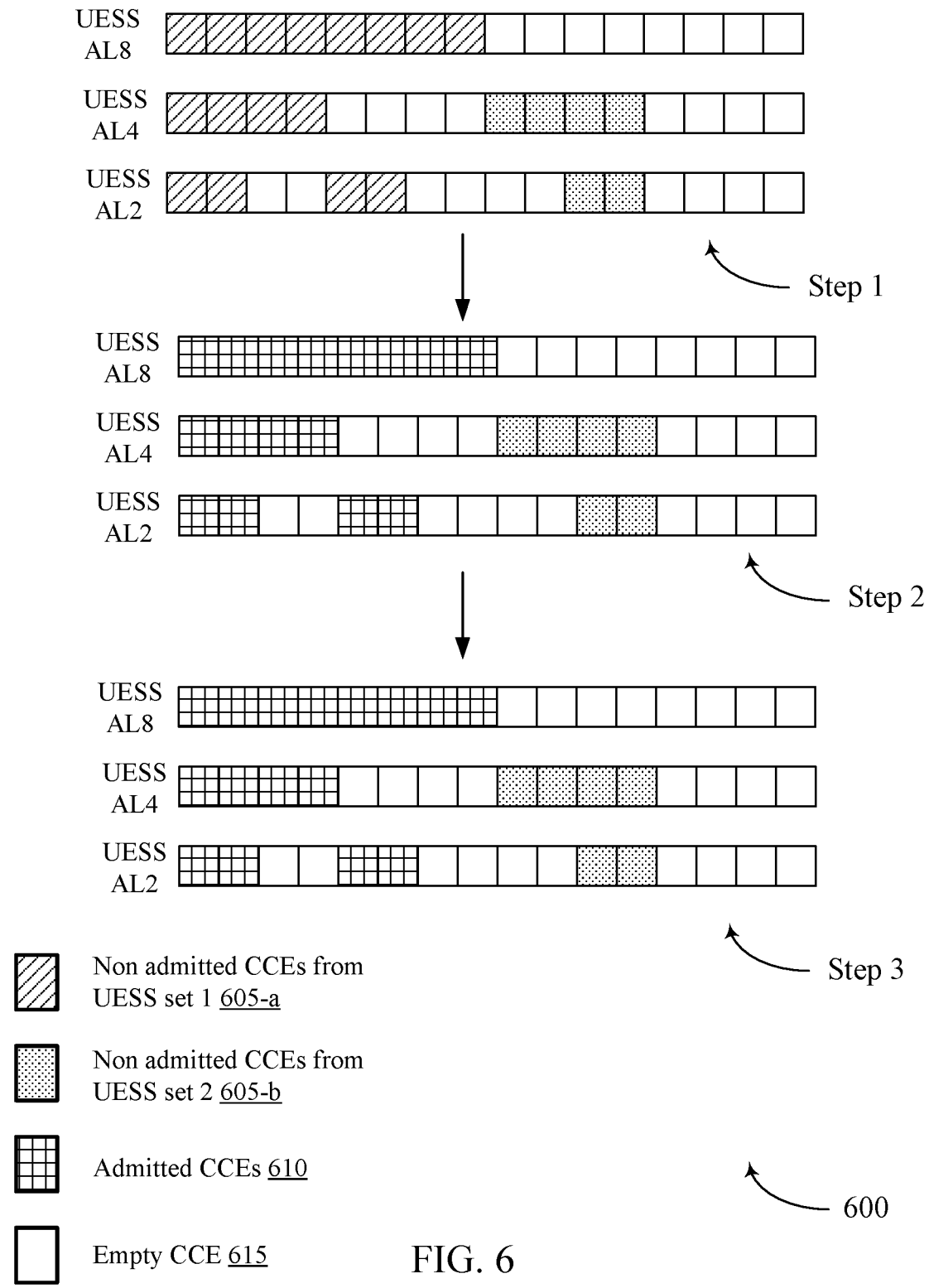
FIG. 6 illustrates an example of a control region in accordance with aspects of the present disclosure.

FIG. 6 illustrates an example of a control region 600 that supports search space design in accordance with aspects of the present disclosure. The control region 600 includes various admitted CCEs 610 and empty CCEs 615. In some examples, control region 600 may support hashing, pruning, and free admission techniques, as described above with reference to FIGS. 1-5. Control region 600 may comprise two (2) UESS sets comprising UE-specific decoding candidates of varying aggregation levels (e.g., AL8, AL4, and AL2). For example, a first UESS set may include one (1) AL8 decoding candidate, one (1) AL4 decoding candidates, and two (2) AL2 decoding candidates, while the second UESS set may include one (1) AL 4 and (1) AL 2 decoding candidates. In some aspects, and for purposes of discussion, CCE limit for control region 600 may be set to 8 CCEs.

As illustrated in step 1, all control channel candidates may initially be considered to be non-admitted candidates (i.e., non-admitted CCEs from UESS set 1 605-a and UESS set 2 605-b). At step 1, in some cases, the UE or base station may proceed to determine the number of CCEs available for hashing the UESS set, which is 8 CCEs for this example. In some aspects, overbooking by configuration may be supported and allowed for control region 600, but the UE may drop search space sets and/or search space set occasions until the CCE or BD limit is reached. In some other cases, the UE may drop search space sets and/or search space set occasions until the number of search space sets and/or search space set occasions is below a threshold.

At step 2, the admission steps may be performed based on the CE budget. For example, the number of AL8 decoding candidates that can be admitted while ensuring the CE budget is not exceeded may be determined. Thus, the UE or base station may proceed to admit one (1) AL8 decoding candidate and update the CE budget to zero (0) CCEs. In some cases, the UE or base station may also check if any free admission may be performed for control channel candidates associated with either of the first UESS set or the second UESS set (i.e., for all AL(s) lower than AL8). Thus, the UE may freely admit one (1) AL 4 control channel candidate and two (2) AL2 control channel candidates, as seen via admitted CCEs 610.

At step 3, the UE or base station may iteratively drop control channel candidates along at least one dimension, such as search space set, or search space set occasions, until the CCE or blind decode limit is reached, or until the number of remaining search space sets or search space set occasions do not exceed a threshold. For instance, the remaining control channel candidates (in this case one (1) AL4 and one (1) AL2) will thus get dropped according to this example. In some aspects, search space set dropping for CCE limit may be based on the worst case assumption of no overlapping CCEs (no free admission).

Figure 7:
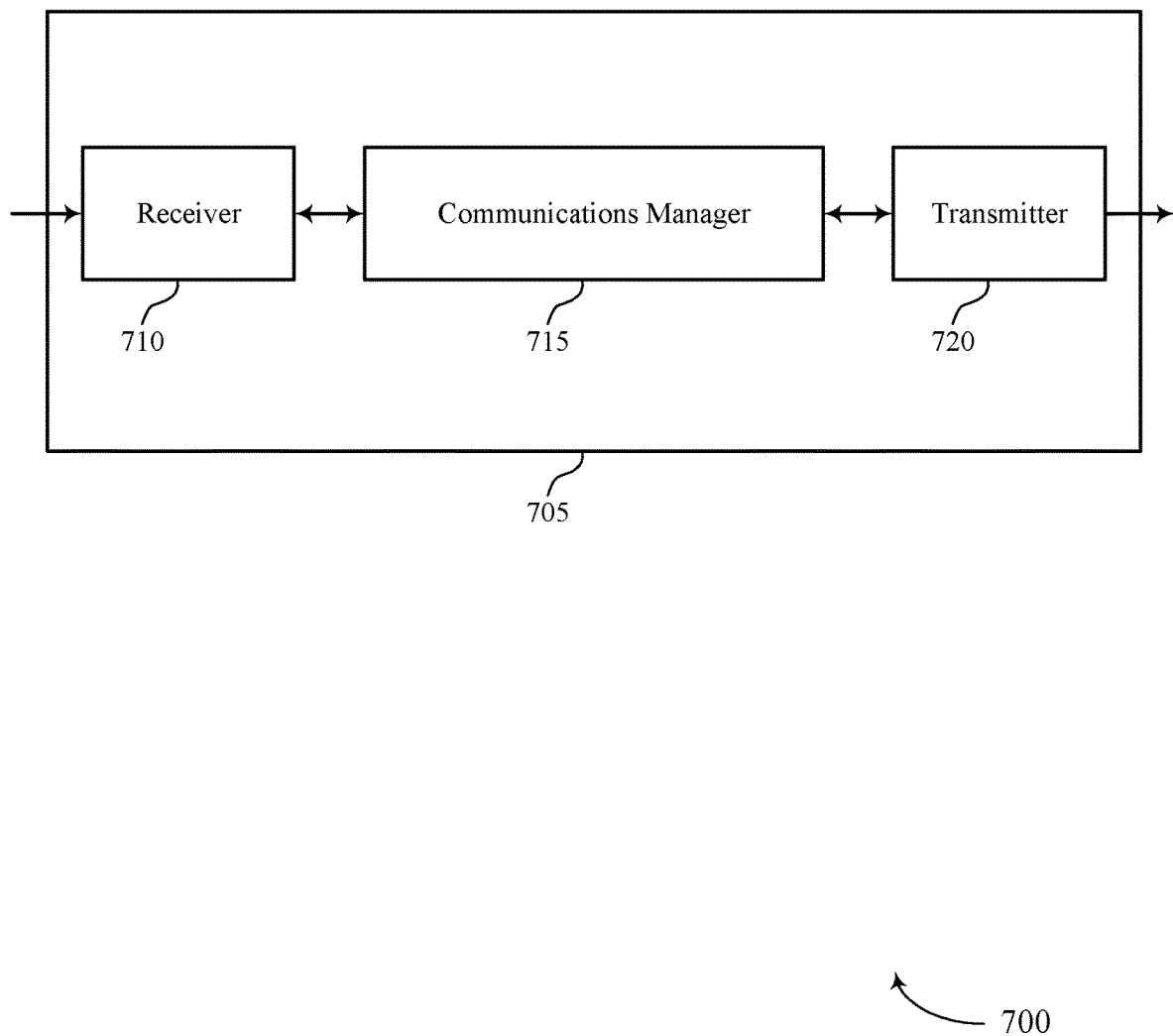
FIGS. 7 and 8 show block diagrams of devices in accordance with aspects of the present disclosure.

FIG. 7 shows a block diagram 700 of a device 705 in accordance with aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to search space design with overbooking, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine an applied set of control channel candidates by allocating the total number of available blind decodes based on a nested mapping scheme over a set of dimensions according to a prioritized order, and communicate based on the applied set of control channel candidates.

The communications manager 715 may also identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine whether an overbooking constraint applies for the slot based on comparing a number of the set of search space set occasions, a total number of control channel candidates, or a total number of configured blind decodes of the set of search space set occasions to a threshold, determine an applied set of control channel candidates based on the determination of whether the overbooking constraint applies for the slot, and communicate based on the applied set of control channel candidates.

The communications manager 715 may also identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, map each control channel candidate for each of the set of search space set occasions to one or more available blind decodes, communicate based on the applied set of control channel candidates, and determine, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver. For example, the transmitter 720 may be an example of aspects of the transceiver 1020 or 1120 as described with reference to FIGS. 10 and 11. The transmitter 720 may utilize a single antenna or a set of antennas.

Figure 8:
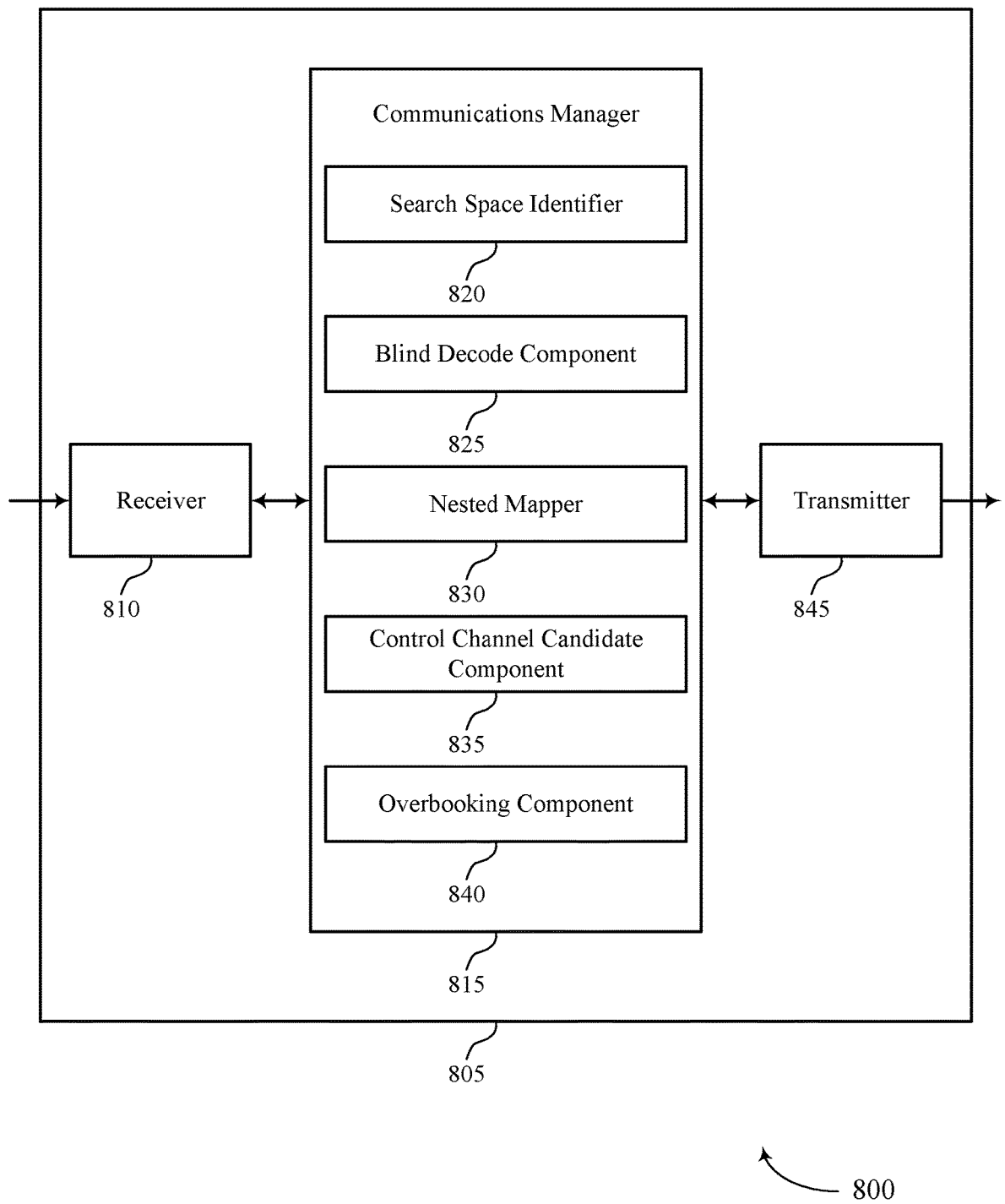

FIG. 8 shows a block diagram 800 of a device 805 in accordance with aspects of the present disclosure. The device 805 may be an example of aspects of a device 705, a UE 115, or a base station 105 as described herein. The device 805 may include a receiver 810, a communications manager 815, and a transmitter 845. The device 805 may also include a processor. Each of these components may be in communication with one another (e.g., via one or more buses).

Receiver 810 may receive information such as packets, user data, or control information associated with various information channels (e.g., control channels, data channels, and information related to search space design with overbooking, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a search space identifier 820, a blind decode component 825, a nested mapper 830, a control channel candidate component 835, and an overbooking component 840. The communications manager 815 may be an example of aspects of the communications manager 1010 or 1110 as described herein.

The search space identifier 820 may identify a set of search space set occasions for a slot, the set of search space set occasions associated with one or more search space sets configured for the slot, each search space set including a set of control channel candidates of one or more aggregation levels of a set of aggregation levels.

The blind decode component 825 may determine a total number of available blind decodes for the slot based on a blind decoding limitation.

The nested mapper 830 may determine an applied set of control channel candidates by allocating the total number of available blind decodes based on a nested mapping scheme over a set of dimensions according to a prioritized order. The nested mapper 830 may determine, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold.

The control channel candidate component 835 may communicate based on the applied set of control channel candidates. The control channel candidate component 835 may determine an applied set of control channel candidates based on the determination of whether the overbooking constraint applies for the slot and communicate based on the applied set of control channel candidates. The control channel candidate component 835 may map each control channel candidate for each of the set of search space set occasions to one or more available blind decodes and communicate based on the applied set of control channel candidates.

The overbooking component 840 may determine whether an overbooking constraint applies for the slot based on comparing a number of the set of search space set occasions, a total number of control channel candidates, or a total number of configured blind decodes of the set of search space set occasions to a threshold.

Transmitter 845 may transmit signals generated by other components of the device 805. In some examples, the transmitter 845 may be collocated with a receiver 810 in a transceiver. For example, the transmitter 845 may be an example of aspects of the transceiver 1020 or 1120 as described with reference to FIGS. 10 and 11. The transmitter 845 may utilize a single antenna or a set of antennas.

Figure 9:
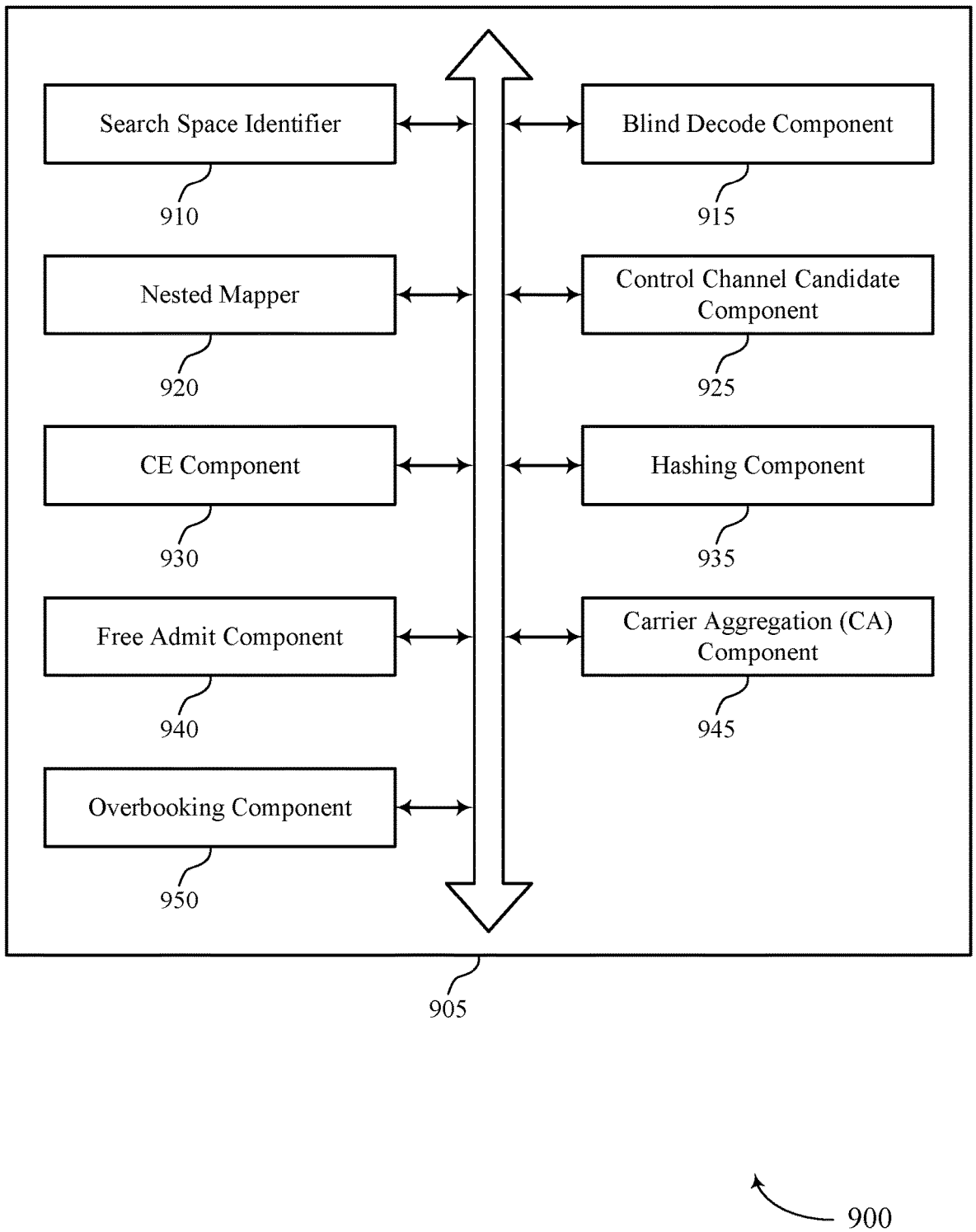
FIG. 9 shows a block diagram of a device in accordance with aspects of the present disclosure.

FIG. 9 shows a block diagram 900 of a communications manager 905 in accordance with aspects of the present disclosure. The communications manager 905 may be an example of aspects of a communications manager 715, a communications manager 815, or a communications manager 1010 described herein. The communications manager 905 may include a search space identifier 910, a blind decode component 915, a nested mapper 920, a control channel candidate component 925, a CE component 930, a hashing component 935, a free admit component 940, a carrier aggregation (CA) component 945, and an overbooking component 950. Each of these modules may communicate, directly or indirectly, with one another (e.g., via one or more buses).

The search space identifier 910 may identify a set of search space set occasions for a slot, the set of search space set occasions associated with one or more search space sets configured for the slot, each search space set including a set of control channel candidates of one or more aggregation levels of a set of aggregation levels. In some cases, the one or more search space sets are associated with a nested search space structure or a non-nested search space structure.

The blind decode component 915 may determine a total number of available blind decodes for the slot based on a blind decoding limitation. In some examples, the blind decode component 915 may allocate the total number of available blind decodes to the set of search space set occasions prior to the allocating the total number of available blind decodes based on the nested mapping scheme over the set of dimensions. In some cases, each control channel candidate of the sets of control channel candidates for each of the search space sets has one blind decoding candidate. In some cases, at least one control channel candidate of the sets of control channel candidates for the one or more search space sets has a set of blind decoding candidates.

The nested mapper 920 may determine an applied set of control channel candidates by allocating the total number of available blind decodes based on a nested mapping scheme over a set of dimensions according to a prioritized order. In some examples, the nested mapper 920 may determine, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold. In some cases, the set of dimensions include indices of the set of search space set occasions, the set of aggregation levels, and control channel candidate indices for respective aggregation levels. In some cases, the total number of available blind decodes is uniformly allocated to the set of search space set occasions. In some cases, the total number of available blind decodes are allocated to the set of search space set occasions in proportion to a number of sets of control channel candidates of the set of search space set occasions. In some cases, the at least one dimension is search space sets or search space set occasions.

The control channel candidate component 925 may communicate based on the applied set of control channel candidates. In some examples, the control channel candidate component 925 may determine an applied set of control channel candidates based on the determination of whether the overbooking constraint applies for the slot. In some examples, the control channel candidate component 925 may communicate based on the applied set of control channel candidates. In some examples, the control channel candidate component 925 may map each control channel candidate for each of the set of search space set occasions to one or more available blind decodes. In some examples, the control channel candidate component 925 may communicate based on the applied set of control channel candidates.

In some examples, the control channel candidate component 925 may admit, according to the nested mapping scheme, the each hashed control channel candidate to the applied set of control channel candidates based on comparing a number of hashed CCEs to the total number of available CCEs. In some examples, the control channel candidate component 925 may identify, for the slot, a set of common decoding candidates associated with one or more common search space sets. In some examples, the control channel candidate component 925 may monitor the set of search space set occasions for the slot for the applied set of control channel candidates. In some examples, the control channel candidate component 925 may communicate with a base station based on control information determined from the monitoring. In some examples, the control channel candidate component 925 may identify, for the slot, a set of common decoding candidates associated with one or more common search space sets. In some examples, the control channel candidate component 925 may monitor the set of search space occasions for the slot for the applied set of control channel candidates. In some examples, the control channel candidate component 925 may identify, for the slot, a set of common decoding candidates associated with a common search space set.

In some cases, the determining the applied set of control channel candidates includes admitting each control channel candidate for each of the set of search space set occasions into the applied set of control channel candidates. In some cases, the determining the applied set of control channel candidates includes allocating the total number of available blind decodes based on a nested mapping scheme over a set of dimensions according to a prioritized order. In some cases, the communicating includes transmitting control information via the applied set of control channel candidates. In some cases, the communicating includes transmitting control information via at least one of the applied set of control channel candidates.

The overbooking component 950 may determine whether an overbooking constraint applies for the slot based on comparing a number of the set of search space set occasions, a total number of control channel candidates, or a total number of configured blind decodes of the set of search space set occasions to a threshold.

In some cases, the number of the set of search space set occasions, the total number of control channel candidates, or the total number of configured blind decodes of the set of search space set occasions is less than the threshold. The CE component 930 may determine a total number of available CCEs for the set of search space set occasions based on a CCE channel estimation limitation.

The hashing component 935 may hash, according to the nested mapping scheme, each control channel candidate to CCEs. In some examples, the hashing component 935 may hash the set of common decoding candidates to control resources of the slot, where the total number of available CCEs is determined based on a number of hashed CCEs for the set of common decoding candidates and the CCE channel estimation limitation. In some examples, the hashing component 935 may identify, during the nested mapping scheme, that the number of hashed CCEs has reached the total number of available CCEs. In some examples, the hashing component 935 may rehash remaining ones of the each hashed control channel candidates to previously hashed CCEs. In some examples, the hashing component 935 may hash the set of common decoding candidates to control resources of the slot, where the total number of available blind decodes is determined based on a number of decoding candidates of the set of common decoding candidates and the blind decoding limitation.

The free admit component 940 may admit, upon determining that the number of hashed CCEs has reached the total number of available CCEs, additional ones of the each hashed control channel candidates to the applied set of control channel candidates based on a condition that hashed CCE locations for the additional ones of the each hashed control channel candidates overlap with previously hashed CCEs.

The carrier aggregation (CA) component 945 may determine if cross-carrier scheduling and/or CA is deployed over a set of component carriers. In some cases, the one or more search space sets include a set of search space sets associated with a set of component carriers, and where the control channel candidate indices include a combined index set for control channel candidates of the set of search space sets associated with the set of component carriers.

Figure 10:
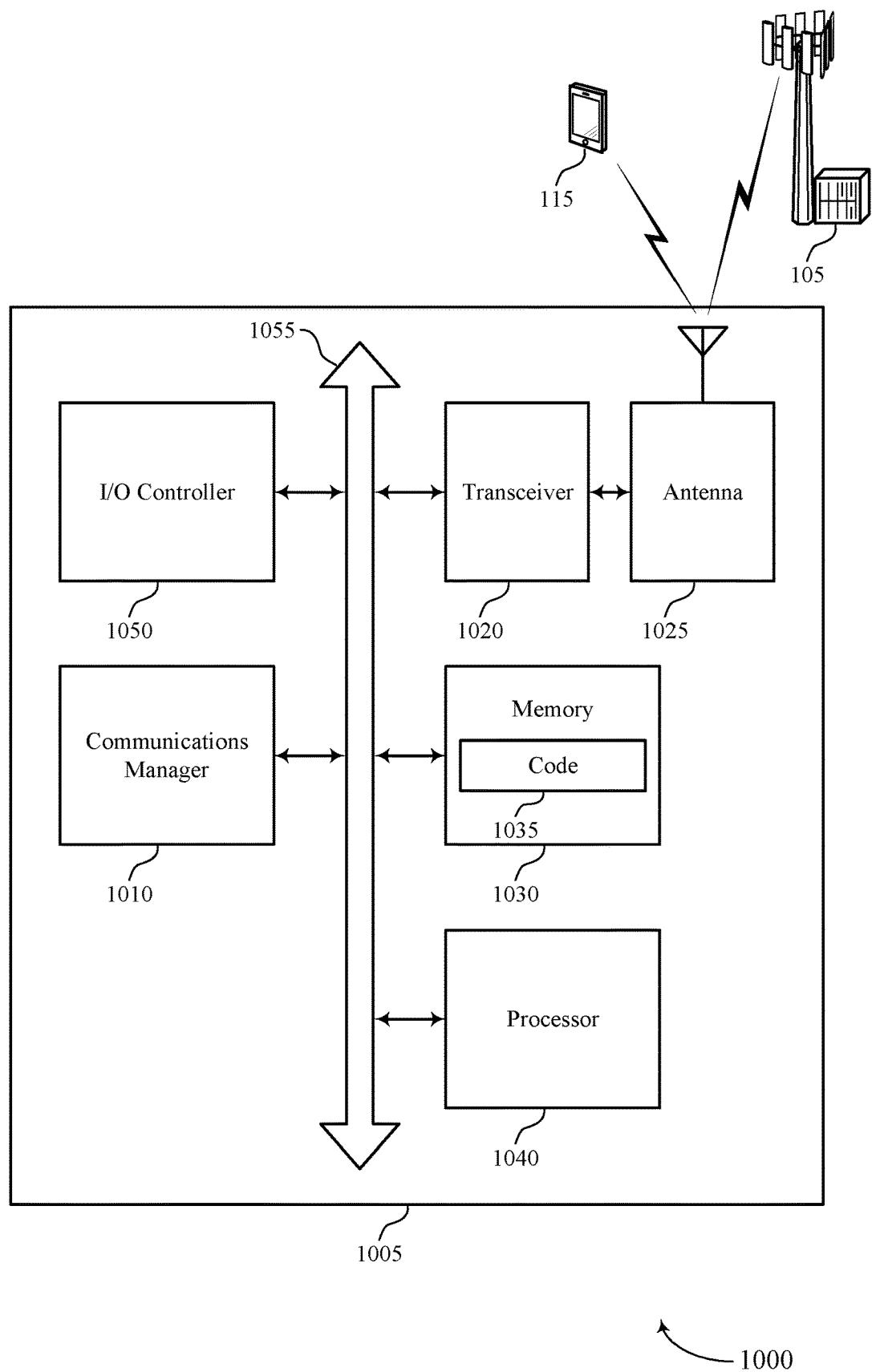
FIG. 10 shows a diagram of a system including a user equipment (UE) in accordance with aspects of the present disclosure.

FIG. 10 shows a diagram of a system 1000 including a device 1005 in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine an applied set of control channel candidates by allocating the total number of available blind decodes based on a nested mapping scheme over a set of dimensions according to a prioritized order, and communicate based on the applied set of control channel candidates. The communications manager 1010 may also identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine whether an overbooking constraint applies for the slot based on comparing a number of the set of search space set occasions, a total number of control channel candidates, or a total number of configured blind decodes of the set of search space set occasions to a threshold, determine an applied set of control channel candidates based on the determination of whether the overbooking constraint applies for the slot, and communicate based on the applied set of control channel candidates.

The communications manager 1010 may also identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, map each control channel candidate for each of the set of search space set occasions to one or more available blind decodes, communicate based on the applied set of control channel candidates, and determine, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting search space design with overbooking).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
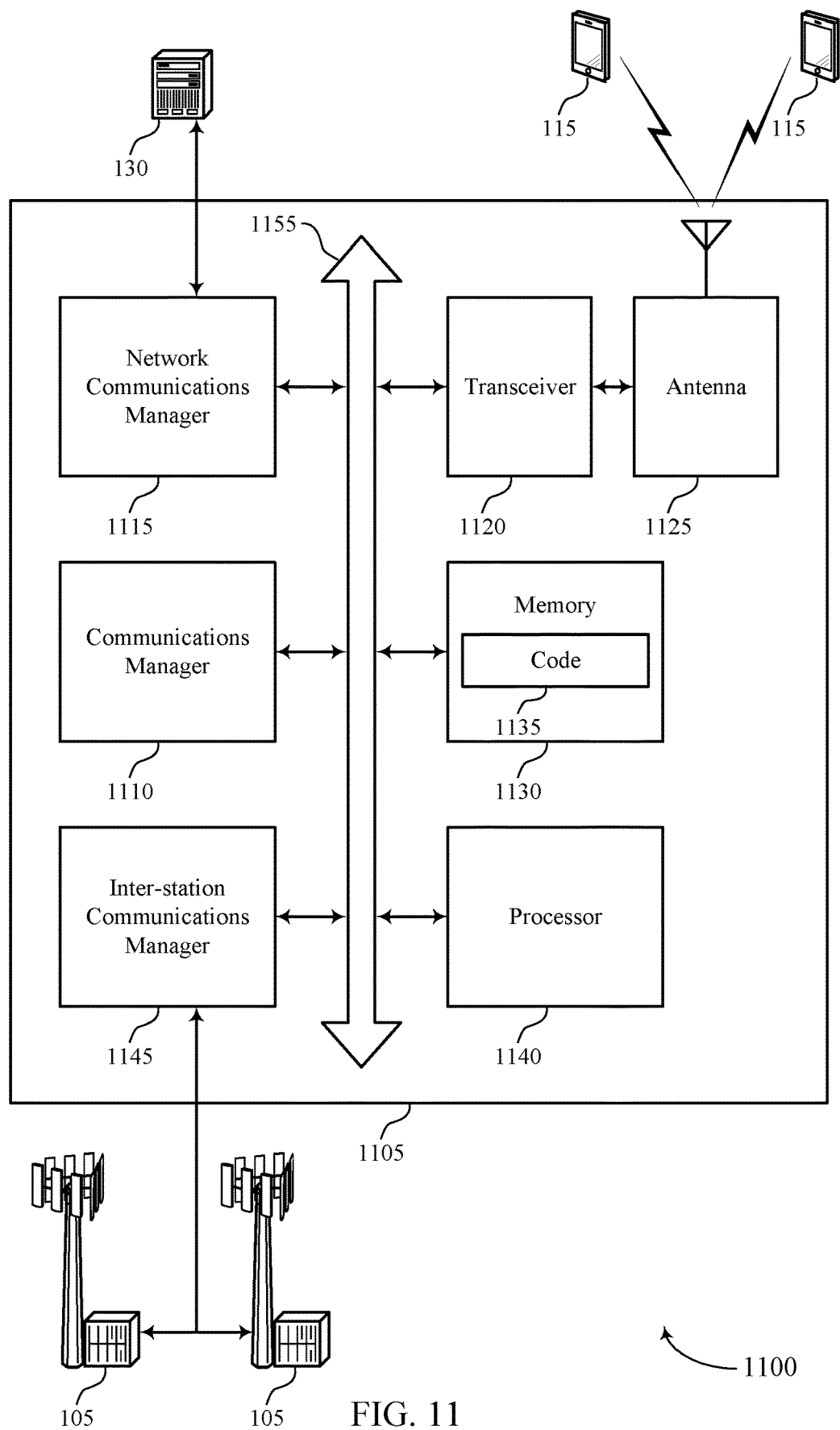
FIG. 11 shows a diagram of a system including a base station in accordance with aspects of the present disclosure.

FIG. 11 shows a diagram of a system 1100 including a device 1105 in accordance with aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine an applied set of control channel candidates by allocating the total number of available blind decodes based on a nested mapping scheme over a set of dimensions according to a prioritized order, and communicate based on the applied set of control channel candidates.

The communications manager 1110 may also identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, determine whether an overbooking constraint applies for the slot based on comparing a number of the set of search space set occasions, a total number of control channel candidates, or a total number of configured blind decodes of the set of search space set occasions to a threshold, determine an applied set of control channel candidates based on the determination of whether the overbooking constraint applies for the slot, and communicate based on the applied set of control channel candidates.

The communications manager 1110 may also identify a set of search space set occasions for a slot, the set of search space set occasions associated with one or more search space sets configured for the slot, each search space set including a set of control channel candidates of one or more aggregation levels of a set of aggregation levels, determine a total number of available blind decodes for the slot based on a blind decoding limitation, map each control channel candidate for each of the set of search space set occasions to one or more available blind decodes, communicate based on the applied set of control channel candidates, and determine, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting search space design with overbooking).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
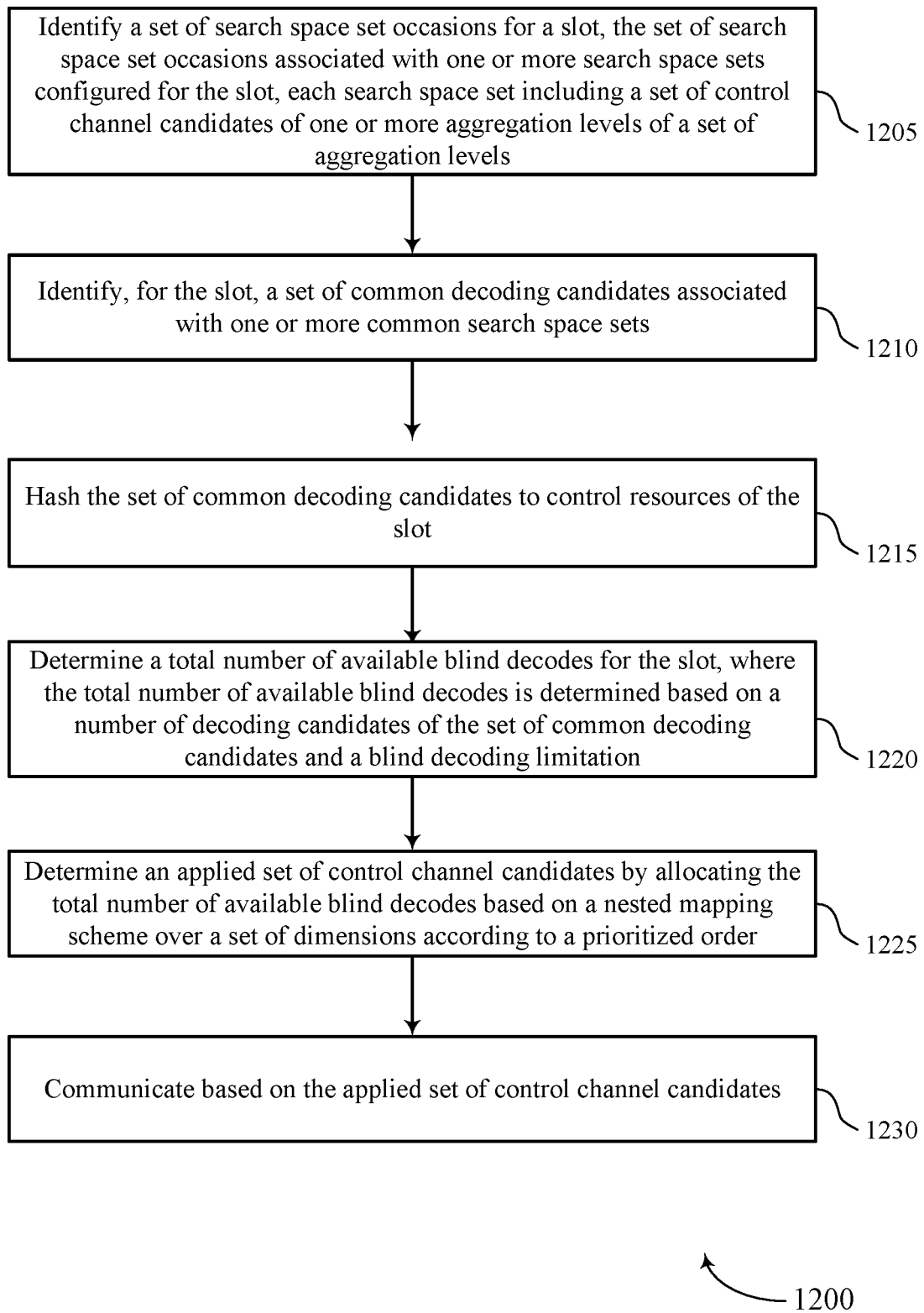
FIGS. 12 through 14 show flowcharts illustrating methods that support search space design in accordance with aspects of the present disclosure.

FIG. 12 shows a flowchart illustrating a method 1200 in accordance with aspects of the present disclosure. The operations of method 1200 may be implemented by a UE 115 or base station 105 or its components as described herein. For example, the operations of method 1200 may be performed by a communications manager as described with reference to FIGS. 7 to 11. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may identify a set of search space set occasions for a slot, the set of search space set occasions associated with one or more search space sets configured for the slot, each search space set including a set of control channel candidates of one or more aggregation levels of a set of aggregation levels. The operations of 1205 may be performed according to the methods described herein. In some examples, aspects of the operations of 1205 may be performed by a search space identifier as described with reference to FIGS. 7 to 11.

At 1210, the UE or base station may identify, for the slot, a set of common decoding candidates associated with one or more common search space sets. The operations of 1210 may be performed according to the methods described herein. In some examples, aspects of the operations of 1210 may be performed by a control channel candidate component as described with reference to FIGS. 7 to 11.

At 1215, the UE or base station may hash the set of common decoding candidates to control resources of the slot. The operations of 1215 may be performed according to the methods described herein. In some examples, aspects of the operations of 1215 may be performed by a hashing component as described with reference to FIGS. 7 to 11.

At 1220, the UE or base station may determine a total number of available blind decodes for the slot, where the total number of available blind decodes is determined based on a number of decoding candidates of the set of common decoding candidates and a blind decoding limitation. The operations of 1220 may be performed according to the methods described herein. In some examples, aspects of the operations of 1220 may be performed by a blind decode component as described with reference to FIGS. 7 to 11.

At 1225, the UE or base station may determine an applied set of control channel candidates by allocating the total number of available blind decodes based on a nested mapping scheme over a set of dimensions according to a prioritized order. The operations of 1225 may be performed according to the methods described herein. In some examples, aspects of the operations of 1225 may be performed by a nested mapper as described with reference to FIGS. 7 to 11.

At 1230, the UE or base station may communicate based on the applied set of control channel candidates. The operations of 1230 may be performed according to the methods described herein. In some examples, aspects of the operations of 1230 may be performed by a control channel candidate component as described with reference to FIGS. 7 to 11.

Figure 13:
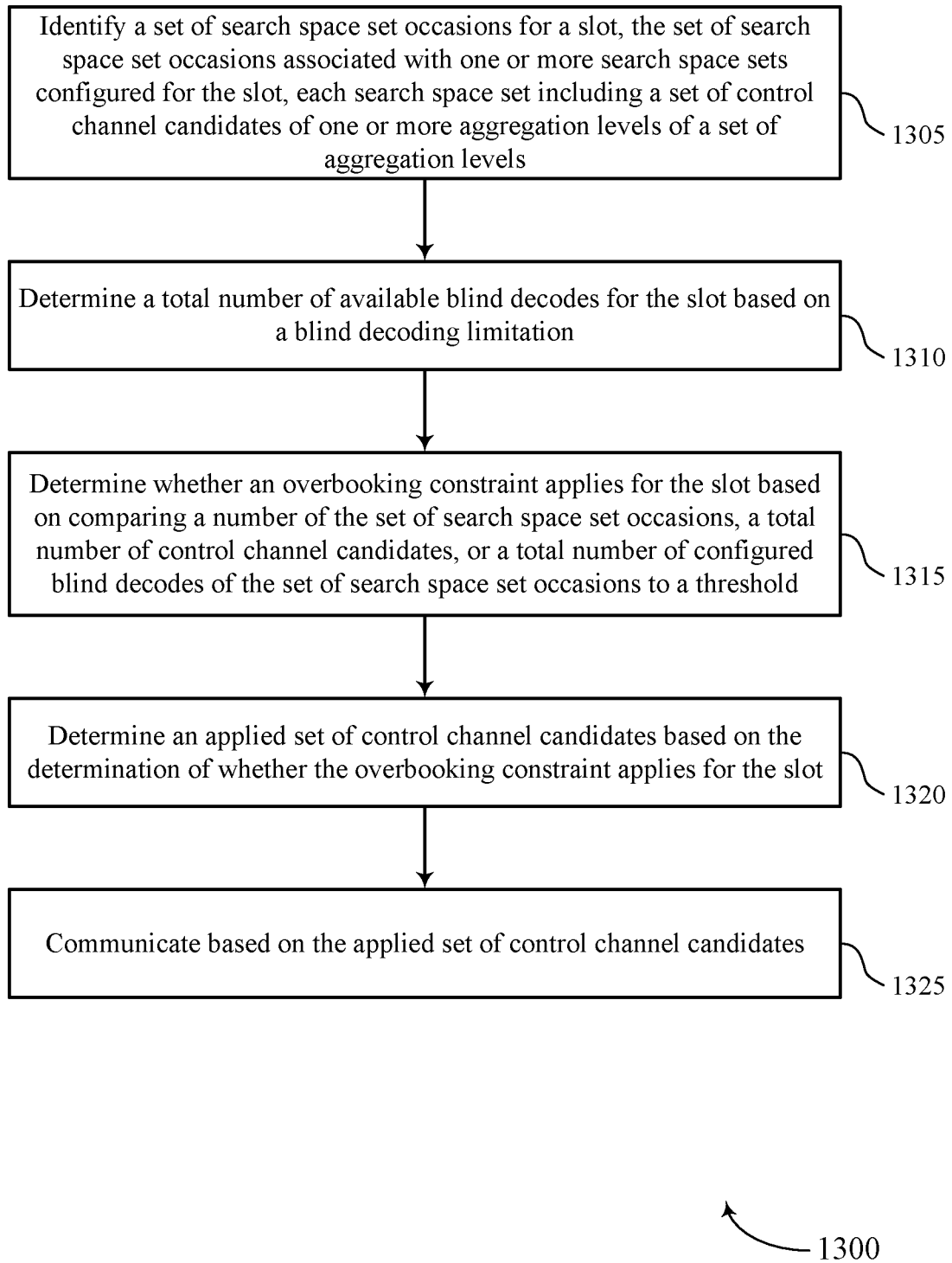

FIG. 13 shows a flowchart illustrating a method 1300 in accordance with aspects of the present disclosure. The operations of method 1300 may be implemented by a UE 115 or base station 105 or its components as described herein. For example, the operations of method 1300 may be performed by a communications manager as described with reference to FIGS. 7 to 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may identify a set of search space set occasions for a slot, the set of search space set occasions associated with one or more search space sets configured for the slot, each search space set including a set of control channel candidates of one or more aggregation levels of a set of aggregation levels. The operations of 1305 may be performed according to the methods described herein. In some examples, aspects of the operations of 1305 may be performed by a search space identifier as described with reference to FIGS. 7 to 11.

At 1310, the UE or base station may determine a total number of available blind decodes for the slot based on a blind decoding limitation. The operations of 1310 may be performed according to the methods described herein. In some examples, aspects of the operations of 1310 may be performed by a blind decode component as described with reference to FIGS. 7 to 11.

At 1315, the UE or base station may determine whether an overbooking constraint applies for the slot based on comparing a number of the set of search space set occasions, a total number of control channel candidates, or a total number of configured blind decodes of the set of search space set occasions to a threshold. The operations of 1315 may be performed according to the methods described herein. In some examples, aspects of the operations of 1315 may be performed by an overbooking component as described with reference to FIGS. 7 to 11.

At 1320, the UE or base station may determine an applied set of control channel candidates based on the determination of whether the overbooking constraint applies for the slot. The operations of 1320 may be performed according to the methods described herein. In some examples, aspects of the operations of 1320 may be performed by a control channel candidate component as described with reference to FIGS. 7 to 11.

At 1325, the UE or base station may communicate based on the applied set of control channel candidates. The operations of 1325 may be performed according to the methods described herein. In some examples, aspects of the operations of 1325 may be performed by a control channel candidate component as described with reference to FIGS. 7 to 11.

Figure 14:
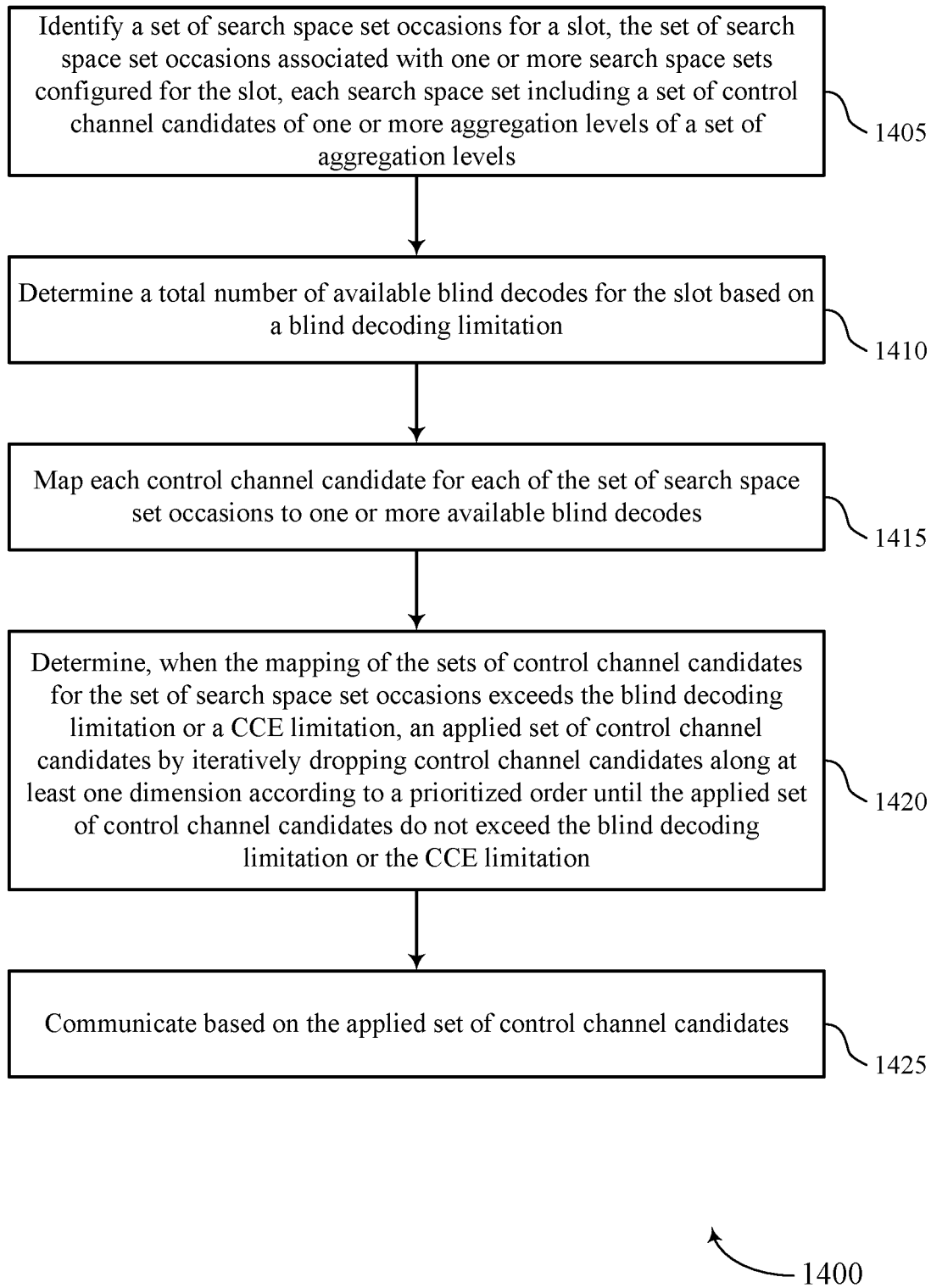

FIG. 14 shows a flowchart illustrating a method 1400 in accordance with aspects of the present disclosure. The operations of method 1400 may be implemented by a UE 115 or base station 105 or its components as described herein. For example, the operations of method 1400 may be performed by a communications manager as described with reference to FIGS. 7 to 11. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may identify a set of search space set occasions for a slot, the set of search space set occasions associated with one or more search space sets configured for the slot, each search space set including a set of control channel candidates of one or more aggregation levels of a set of aggregation levels. The operations of 1405 may be performed according to the methods described herein. In some examples, aspects of the operations of 1405 may be performed by a search space identifier as described with reference to FIGS. 7 to 11.

At 1410, the UE or base station may determine a total number of available blind decodes for the slot based on a blind decoding limitation. The operations of 1410 may be performed according to the methods described herein. In some examples, aspects of the operations of 1410 may be performed by a blind decode component as described with reference to FIGS. 7 to 11.

At 1415, the UE or base station may map each control channel candidate for each of the set of search space set occasions to one or more available blind decodes. The operations of 1415 may be performed according to the methods described herein. In some examples, aspects of the operations of 1415 may be performed by a control channel candidate component as described with reference to FIGS. 7 to 11.

At 1420, the UE or base station may determine, when the mapping of the sets of control channel candidates for the set of search space set occasions exceeds the blind decoding limitation or a CCE limitation, an applied set of control channel candidates by iteratively dropping control channel candidates along at least one dimension according to a prioritized order until the applied set of control channel candidates do not exceed the blind decoding limitation or the CCE limitation, or until the number of remaining search space sets or search space set occasions do not exceed a threshold. The operations of 1420 may be performed according to the methods described herein. In some examples, aspects of the operations of 1420 may be performed by a nested mapper as described with reference to FIGS. 7 to 11.

At 1425, the UE or base station may communicate based on the applied set of control channel candidates. The operations of 1425 may be performed according to the methods described herein. In some examples, aspects of the operations of 1425 may be performed by a control channel candidate component as described with reference to FIGS. 7 to 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a plurality of search space set occasions for a slot, the plurality of search space set occasions associated with a common search space set, a first user equipment (UE) specific search space set, and a second UE specific search space set configured for the slot, the common search space set comprising a set of common decoding candidates of one or more aggregation levels of a plurality of aggregation levels, the first UE specific search space set comprising a first set of UE specific decoding candidates, and the second UE specific search space set comprising a second set of UE specific decoding candidates;
   determining an applied set of control channel candidates comprising the set of common decoding candidates of the common search space set and at least a subset of the first set of UE specific decoding candidates of the first UE specific search space set by dropping an entirety of the second UE specific search space set including the second set of UE specific decoding candidates so that a total number of the applied set of control channel candidates satisfies a control channel element limitation; and
   communicating based at least in part on the applied set of control channel candidates.

2. The method of claim 1, wherein determining the applied set of control channel candidates comprises:
   identifying, for the slot, the set of common decoding candidates associated with the common search space set; and
   determining the applied set of control channel candidates by including the set of common decoding candidates in the applied set of control channel candidates before including a UE specific decoding candidate from the first set of UE specific decoding candidates in the applied set of control channel candidates.

3. The method of claim 1, wherein the communicating comprises:
   monitoring of the plurality of search space set occasions for the slot for the applied set of control channel candidates; and
   communicating with a base station based at least in part on control information determined from the monitoring.

4. The method of claim 1, wherein the communicating comprises transmitting control information via at least one of the applied set of control channel candidates.

5. The method of claim 2, further comprising:
   determining a number of remaining control channel candidates to be applied based at least in part on a number of the set of common decoding candidates and the control channel element limitation;
   identifying, for the slot, the first set of UE specific decoding candidates associated with the first UE specific search space set; and
   determining the applied set of control channel candidates by including the subset of the first set of UE specific decoding candidates based at least in part on the number of remaining control channel candidates.

6. The method of claim 1, further comprising:
identifying the second UE specific search space set for the dropping based at least in part on a search space set index associated with the second UE specific search space set.

7. An apparatus for wireless communication, comprising:
a processor;
memory coupled with the processor; and
instructions stored in the memory and executable by the processor to cause the apparatus to:
identify a plurality of search space set occasions for a slot, the plurality of search space set occasions associated with a common search space set, a first user equipment (UE) specific search space set, and a second UE specific search space set configured for the slot, the common search space set comprising a set of common decoding candidates of one or more aggregation levels of a plurality of aggregation levels, the first UE specific search space set comprising a first set of UE specific decoding candidates, and the second UE specific search space set comprising a second set of UE specific decoding candidates;
determine an applied set of control channel candidates comprising the set of common decoding candidates of the common search space set and at least a subset of the first set of UE specific decoding candidates of the first UE specific search space set by dropping an entirety of the second UE specific search space set including the second set of UE specific decoding candidates so that a total number of the applied set of control channel candidates satisfies a control channel element limitation; and
communicate based at least in part on the applied set of control channel candidates.

8. The apparatus of claim 7, wherein the instructions to determine the applied set of control channel candidates are executable by the processor to cause the apparatus to:
identify, for the slot, the set of common decoding candidates associated with the common search space set; and
determine the applied set of control channel candidates by including the set of common decoding candidates in the applied set of control channel candidates before including a UE specific decoding candidate from the first set of UE specific decoding candidates in the applied set of control channel candidates.

9. The apparatus of claim 7, wherein the instructions to communicate are executable by the processor to cause the apparatus to:
monitor of the plurality of search space set occasions for the slot for the applied set of control channel candidates; and
communicate with a base station based at least in part on control information determined from the monitoring.

10. The apparatus of claim 7, wherein the communicating comprises transmitting control information via at least one of the applied set of control channel candidates.

11. The apparatus of claim 7, wherein the instructions are further executable by the processor to cause the apparatus to:
determine a number of remaining control channel candidates to be applied based at least in part on a number of the set of common decoding candidates and the control channel element limitation;
identify, for the slot, the first set of UE specific decoding candidates associated with the first UE specific search space set; and
determine the applied set of control channel candidates by including the subset of the first set of UE specific decoding candidates based at least in part on the number of remaining control channel candidates.

12. The apparatus of claim 7, wherein the instructions are further executable by the processor to cause the apparatus to:
identify the second UE specific search space set for the dropping based at least in part on a search space set index associated with the second UE specific search space set.

13. An apparatus for wireless communication, comprising:
means for identifying a plurality of search space set occasions for a slot, the plurality of search space set occasions associated with a common search space set, a first user equipment (UE) specific search space set, and a second UE specific search space set configured for the slot, the common search space set comprising a set of common decoding candidates of one or more aggregation levels of a plurality of aggregation levels, the first UE specific search space set comprising a first set of UE specific decoding candidates, and the second UE specific search space set comprising a second set of UE specific decoding candidates;
means for determining an applied set of control channel candidates comprising the set of common decoding candidates of the common search space set and at least a subset of the first set of UE specific decoding candidates of the first UE specific search space set by dropping an entirety of the second UE specific search space set including the second set of UE specific decoding candidates so that a total number of the applied set of control channel candidates satisfies a control channel element limitation; and
means for communicating based at least in part on the applied set of control channel candidates.

14. The apparatus of claim 13, wherein the means for determining the applied set of control channel candidates comprises:
means for identifying, for the slot, the set of common decoding candidates associated with the common search space set; and
means for determining the applied set of control channel candidates by including the set of common decoding candidates in the applied set of control channel candidates before including a UE specific decoding candidate from the first set of UE specific decoding candidates in the applied set of control channel candidates.

15. The apparatus of claim 13, wherein the means for communicating comprises:
means for monitoring of the plurality of search space set occasions for the slot for the applied set of control channel candidates; and
means for communicating with a base station based at least in part on control information determined from the monitoring.

16. The apparatus of claim 13, wherein the means for communicating comprises means for transmitting control information via at least one of the applied set of control channel candidates.

17. The apparatus of claim 13, further comprising:
means for determining a number of remaining control channel candidates to be applied based at least in part on a number of the set of common decoding candidates and the control channel element limitation;
means for identifying, for the slot, the first set of UE specific decoding candidates associated with the first UE specific search space set; and means for determining the applied set of control channel candidates by including the subset of the first set of UE specific decoding candidates based at least in part on the number of remaining control channel candidates.

18. The apparatus of claim 13, further comprising:
means for identifying the second UE specific search space set for the dropping based at least in part on a search space set index associated with the second UE specific search space set.

19. A non-transitory computer-readable medium storing code for wireless communication, the code comprising instructions executable by a processor to:
identify a plurality of search space set occasions for a slot, the plurality of search space set occasions associated with a common search space set, a first user equipment (UE) specific search space set, and a second UE specific search space set configured for the slot, the common search space set comprising a set of common decoding candidates of one or more aggregation levels of a plurality of aggregation levels, the first UE specific search space set comprising a first set of UE specific decoding candidates, and the second UE specific search space set comprising a second set of UE specific decoding candidates;
determine an applied set of control channel candidates comprising the set of common decoding candidates of the common search space set and at least a subset of the first set of UE specific decoding candidates of the first UE specific search space set by dropping an entirety of the second UE specific search space set including the second set of UE specific decoding candidates so that a total number of the applied set of control channel candidates satisfies a control channel element limitation; and
communicate based at least in part on the applied set of control channel candidates.

20. The non-transitory computer-readable medium of claim 19, wherein the instructions to determine the applied set of control channel candidates are executable by the processor to:
identify, for the slot, the set of common decoding candidates associated with the common search space set; and
determine the applied set of control channel candidates by including the set of common decoding candidates in the applied set of control channel candidates before including a UE specific decoding candidate from the first set of UE specific decoding candidates in the applied set of control channel candidates.

21. The non-transitory computer-readable medium of claim 19, wherein the instructions to communicate are executable by the processor to:
monitor of the plurality of search space set occasions for the slot for the applied set of control channel candidates; and
communicate with a base station based at least in part on control information determined from the monitoring.

22. The non-transitory computer-readable medium of claim 19, wherein the communicating comprises transmitting control information via at least one of the applied set of control channel candidates.

23. The non-transitory computer-readable medium of claim 19, wherein the instructions are further executable by the processor to:
determine a number of remaining control channel candidates to be applied based at least in part on a number of the set of common decoding candidates and the control channel element limitation;
identify, for the slot, the first set of UE specific decoding candidates associated with the first UE specific search space set; and
determine the applied set of control channel candidates by including the subset of the first set of UE specific decoding candidates based at least in part on the number of remaining control channel candidates.

24. The non-transitory computer-readable medium of claim 19, wherein the instructions are further executable by the processor to:
identify the second UE specific search space set for the dropping based at least in part on a search space set index associated with the second UE specific search space set.

* * * * *